United States Patent
Alexander

(10) Patent No.: US 6,239,796 B1
(45) Date of Patent: *May 29, 2001

(54) APPARATUS AND METHOD FOR CONTROLLING DIALOG BOX DISPLAY AND SYSTEM INTERACTIVITY IN A SIGNAL MEASUREMENT SYSTEM

(75) Inventor: Jay A. Alexander, Monument, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/094,088

(22) Filed: Jun. 9, 1998

(51) Int. Cl.⁷ ........................................................ G06F 3/14
(52) U.S. Cl. ........................... 345/339; 345/340; 345/347; 345/348; 345/352
(58) Field of Search .................................... 345/340, 347, 345/975, 346, 356, 352, 348, 354

(56) References Cited

U.S. PATENT DOCUMENTS

| | | | | |
|---|---|---|---|---|
| 5,414,810 | * | 5/1995 | Doyle et al. | 395/346 |
| 5,438,659 | * | 8/1995 | Notess et al. | 345/335 |
| 5,546,521 | * | 8/1996 | Martinez | 395/338 |
| 5,675,520 | * | 10/1997 | Pitt, III et al. | 364/578 |
| 5,754,426 | * | 5/1998 | Dumais | 364/188 |
| 5,825,358 | * | 10/1998 | Silvent et al. | 345/340 |
| 5,828,376 | * | 10/1998 | Solimene et al. | 345/352 |
| 5,886,694 | * | 3/1999 | Breinberg et al. | 345/340 |
| 5,926,177 | * | 7/1999 | Hatanaka et al. | 345/340 |
| 5,949,417 | * | 9/1999 | Calder | 345/342 |
| 5,953,009 | * | 9/1999 | Alexander | 345/348 |
| 5,995,103 | * | 11/1999 | Ashe | 345/346 |
| 6,002,398 | * | 12/1999 | Wilson | 345/346 |
| 6,009,519 | * | 12/1999 | Jones et al. | 713/1 |
| 6,016,143 | * | 1/2000 | Heinzman | 345/339 |
| 6,091,415 | * | 7/2000 | Chang et al. | 345/347 |

FOREIGN PATENT DOCUMENTS

0376695A2 * 7/1990 (EP).

* cited by examiner

Primary Examiner—Raymond J. Bayerl
Assistant Examiner—Thomas T. Nguyen

(57) ABSTRACT

A signal measurement system is disclosed. The signal measurement system includes an operating system and a graphical user interface. A dialog box control system constructed and arranged to manage display and interactivity with respect to a selected one of a plurality of dialog boxes to be opened on the graphical user interface in accordance with a selected one of a plurality of dialog launch modalities is included in the signal measurement system. For each of the plurality of dialog launch modalities the dialog box control system closes open dialog boxes not having a predetermined relationship with the selected dialog box, thereby achieving a display clarity associated with the selected dialog box modality. Preferably, for each of the plurality of dialog launch modalities the dialog box control system controls user interactivity with the system beyond an active dialog box, thereby also achieving an extent of system interactivity associated with the selected dialog box modality. It is also preferred that the dialog box control system applies immediately to the signal measurement system control inputs provided to the active dialog box.

63 Claims, 13 Drawing Sheets

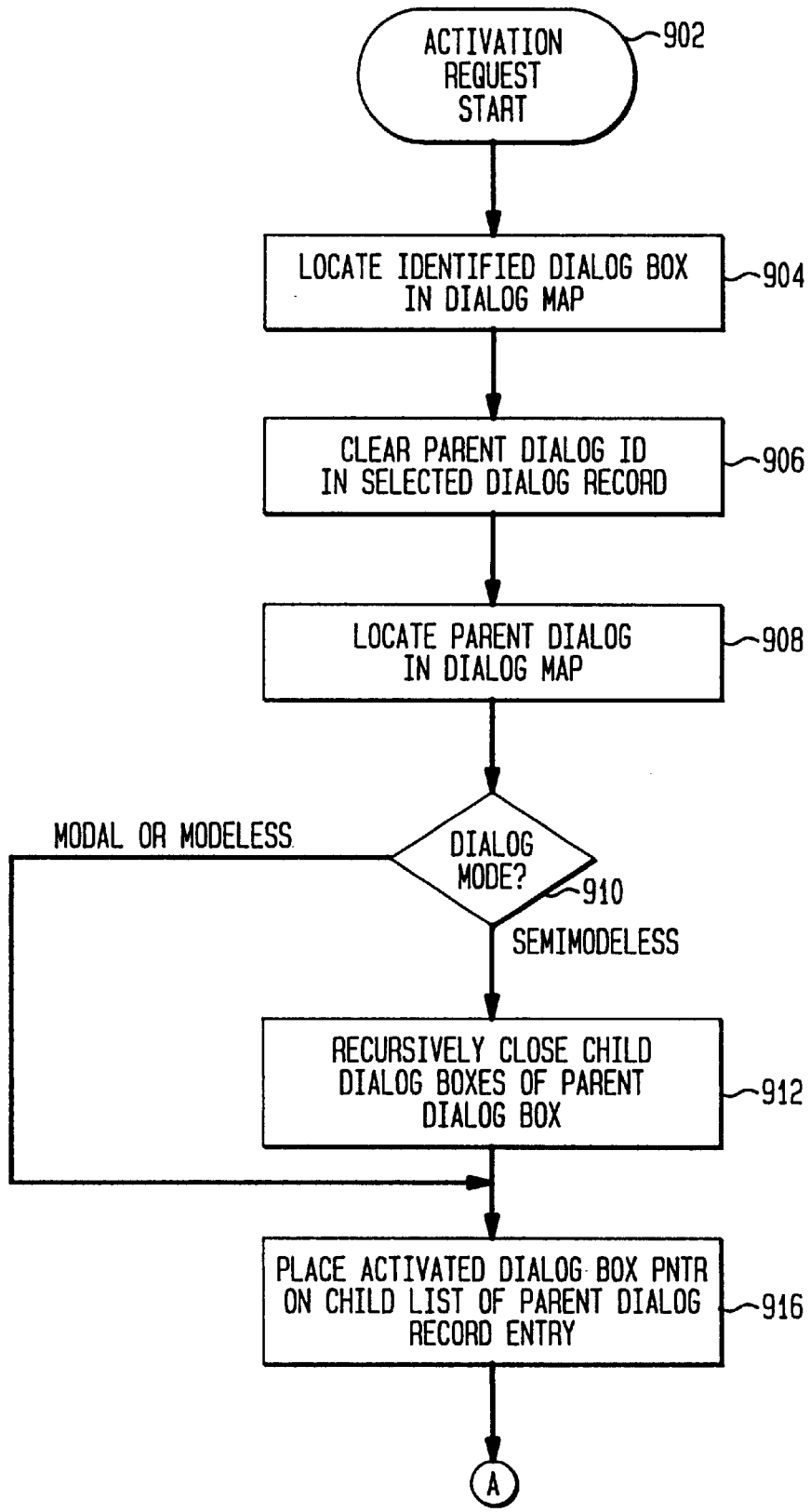

APPARATUS AND METHOD FOR CONTROLLING DIALOG BOX DISPLAY AND SYSTEM INTERACTIVITY IN A SIGNAL MEASUREMENT SYSTEM

RELATED APPLICATIONS

This application is related to commonly owned application entitled "Apparatus and Method For Controlling Dialog Box Display and System Interactivity in a Computer-Based System," filed concurrently herewith and name as inventor Jay A. Alexander.

BACKGROUND OF THE INVENTION

1. Field of the Invention

The present invention relates generally to signal measurement systems and, more particularly, to the display and control of dialog boxes in a signal measurement system.

2. Related Art

A common technique for presenting information to users of computer-based systems is through use of a graphical user interface (GUI). A graphical user interface is typically part of an environment provided by an operating system executed by a processor in the computer system. Generally, the GUI is controlled the operating system in response to commands provided by a user and application programs or other processes executing on or accessible to the computer-based system.

Common to virtually all conventional GUIs is the use of a mouse or other pointing device in a windowed environment. Windows are rectangular areas presented on a display that contain textual and/or graphical information related to the operation of the application program, operating system or other processes. Generally, additional display elements are provided by the GUI to facilitate interactions with the windows. These include, for example, menus, title bars, buttons, select boxes and icons. For a more detailed explanation of the operation of GUIs in general and Windows® in particular, see "Microsoft Windows version 3.1 User's Guide," and "Microsoft Windows 95 User's Guide," available from Microsoft, Inc.

In this environment, the user interacts with the computer by using a keyboard and/or by manipulating the cursor displayed on the GUI with a pointing device. To enter information into the computer system, a user typically interacts with a displayed window. In addition, under certain circumstances a "dialog box" is displayed on the GUI to enable the user to enter specific information into the computer system. Dialog boxes are special windows presented on the GUI to facilitate providing inputs to the computer to control application programs or other processes occurring within or accessible to the computer system. Dialog boxes generally present logically related control input display elements, such as fields for numeric or text entry, icons, select boxes, buttons and a myriad of other known display elements that enable a user to set parameters or otherwise effect control of the desired process or system.

The manner in which the computer user interface is controlled with respect to the display of dialog boxes is referred to herein as "dialog box modality." Conventional operating systems such as Windows 95® provide application programs and other processes with the ability to invoke two dialog box modalities. Each modality provides a different computer user interface environment with respect to the display and control of an invoked or activated dialog box. These two conventional dialog box modalities are commonly referred to as the "modal" and the "modeless" dialog box modalities.

Dialog boxes presented in accordance with the modal dialog box modality operate such that once the dialog box is invoked it is displayed as the active dialog box. An active dialog box is a dialog box that is established to receive user inputs. In some systems, when multiple dialog boxes are displayed, the inactive dialog box(es) is/are displayed with a reduced intensity, highlighting the one active dialog box. Thereafter the active dialog box must be explicitly closed by the user before other GUI display elements are made accessible to the user. On the other hand, dialog boxes that are invoked in accordance with the modeless dialog box modality operate such that the user can access other elements of the GUI without having to close the active dialog box. This includes the ability to select display elements that cause other dialog boxes to be invoked, the ability to make such other dialog boxes the active dialog box, as well as to perform other operations on the GUI unrelated to the displayed dialog box(es).

These traditional approaches to controlling dialog box display and concurrent system interactivity have a significant number of drawbacks limiting the user's ability to fully utilize the implementing computer-based system. For example, the modal dialog box modality prevents the user from interacting with other components of the GUI and other user interfaces while a dialog box is displayed. This is problematic in that the user often needs to access other system components prior to the completion of entering control information into the active dialog box.

To do this, the user must first close the active dialog box. This may be accomplished by any one of many known techniques. For example, the user may close the dialog box by selecting an "OK" or "Enter" selection button, either one of which results in the application of the entered control information to the implementing computer system. Use of these and other methods for closing a dialog box in a manner that instructs the operating system that the entered control information and selections are to be applied to the implementing computer system when the dialog box is closed, is referred to herein as selectively closing the dialog box. Alternatively, the user may close the dialog box by selecting the "Cancel or "Close" selection buttons or by selecting a "Close" or "Exit" menu item or the like, any one of which results in any control inputs entered into the dialog box to not be applied to the implementing computer system. These and other methods for closing a dialog box in a manner that instructs the operating system that the entered control information and selections are not to be applied to the implementing computer system when the dialog box is closed is referred to herein as non-selectively closing the dialog box. Once the dialog box is closed, the user can then access the desired window or other user interface element to obtain the desired information. Then, the dialog box can be reselected and displayed to enable the user to continue to enter in additional or modified control information.

For example, a user may need to access a displayed window on the GUI to obtain additional information for determining the values of the control information that are to be provided through the dialog box. However, such windows are not currently displayed or there are multiple windows simultaneously displayed and the control information requested by the dialog box is related to information displayed in a window that is currently overlayed and, therefore, not visible to the user. A similar problem arises when the information requested by the dialog box cannot be provided by the user with the required precision. The resulting effect from the application of a first set of control input values to the controlled process or system must be observed. Then additional or modified control inputs can be provided by the user and applied to the process or system as necessary. As a result, when the relationship between the desired control adjustments and system operations is complex, an iterative process may occur, with the user entering control information into a dialog box, closing the dialog box, making observations or performing related control adjustments, and then reinvoking the dialog box to make further control adjustments. This is highly inefficient and very frustrating for the user.

The modeless dialog box modality provides an interface environment that overcomes the above drawbacks to the modal dialog box modality. This is because, as noted, the modeless dialog box modality does not restrict the user's access to other GUI display elements beyond an active dialog box. However, there are many drawbacks to this modality as well.

First, this dialog box modality often results in significant display clutter. A user may simultaneously open as many dialog boxes as desired and enter control information therein. The user may select a different active dialog box among the open dialog boxes simply by selecting a desire dialog box with the cursor and pointing device. However, dialog boxes are typically positioned so as to at least partially overlay the window with which they are associated. Simultaneous display of multiple such dialog boxes eventually obscures visibility of the underlying window. This may occur more readily in those computer-based systems such as instruments which have small display screens. A display of a single dialog box covers a substantial portion of such display screens. Thus, in systems implementing the modeless dialog box modality, the user must close each dialog box prior to proceeding to open another to avoid display clutter. Otherwise, the user must eventually close the open dialog boxes that are displayed on the GUI. To do this, the user must make each dialog box the active dialog box, and then selectively or non-selectively close that dialog box. This has been found to interfere with the activities of more advanced users of the implementing computer-based system as time and effort is diverted from performing desired operations to managing the graphical user interface.

What is needed, therefore, is an apparatus and method of controlling a graphical user interface with respect to dialog boxes such that the user is provided with a desired degree of interactivity with the GUI without unnecessarily cluttering the display. Such an environment should also provide such a dialog box modality with a limited user involvement to eliminate the time and effort associated with managing the graphical user interface.

SUMMARY OF THE INVENTION

The present invention overcomes the above and other drawbacks to conventional dialog box management techniques. In one aspect of the invention, a signal measurement system is disclosed. The signal measurement system includes an operating system and a graphical user interface. A dialog box control system constructed and arranged to manage display and interactivity with respect to a selected one of a plurality of dialog boxes to be opened on the graphical user interface in accordance with a selected one of a plurality of dialog launch modalities is included in the signal measurement system. For each of the plurality of dialog launch modalities the dialog box control system closes open dialog boxes not having a predetermined relationship with the selected dialog box, thereby achieving a display clarity associated with the selected dialog box modality. Preferably, for each of the plurality of dialog launch modalities the dialog box control system controls user interactivity with the system beyond an active dialog box, thereby also achieving an extent of system interactivity associated with the selected dialog box modality. It is also preferred that the dialog box control system applies immediately to the signal measurement system control inputs provided to the active dialog box.

In one embodiment, the dialog box control system includes a plurality of dialogs each constructed and arranged to control display of and interaction with an associated dialog box. The dialog box control system also includes a dialog manager constructed and arranged to selectively provide selected ones of the plurality of dialogs with dialog box control requests generated by the graphical user interface. The dialog manager is also constructed and arranged to selectively cause the generation of selected system calls to the operating system to implement the selected dialog launch modality. Each system call causes the operating system to process certain user inputs.

In another embodiment, each dialog box includes a plurality of temporary dialog boxes each of which is opened in response to user selection of representative launch display element displayed on the graphical user interface, and which is closed. The temporary dialog boxes is closed by one of selectively or non-selectively. In one embodiment, the temporary dialog boxes may be opened in response to an occurrence of one or more events. Also, in some embodiments, the plurality of dialog boxes also include one or more permanent dialog boxes that are permanently displayed on the graphical user interface. The dialog manager causes control inputs provided to the permanent dialog boxes to be applied immediately to the signal measurement system. It is understood that the representative dialog launch display element may be one of a plurality of representative dialog launch display elements.

In one preferred embodiment, the plurality of dialog boxes are logically associated in a hierarchial relationship based on the location of the representative dialog launch display element used to launch each dialog box. In this embodiment, the dialog launch modalities include a modal dialog launch modality for which the dialog box control system provides a first degree of display clarity and a first extent of system interactivity beyond the active dialog box. The dialog launch modalities also include a semi-modeless dialog launch modality for which the dialog box control system provides a second degree of display clarity substantially the same as the first degree of display clarity. The dialog box control system also provides a second extent of system interactivity beyond the active dialog box that is greater than the first extent of system interactivity. In one preferred embodiment, the dialog launch modalities also include a modeless dialog launch modality. In this modality the dialog box control system provides a third degree of display clarity substantially less than the first degree of display clarity and the second degree of display clarity. It also provides a third extent of system interactivity beyond the active dialog box that is greater than the first extent of system interactivity and the second extent of system interactivity.

In another embodiment, the plurality of dialog boxes are logically associated as noted and the dialog launch modalities include a modal dialog launch modality wherein only the selected dialog box and its parent dialog boxes are open simultaneously, and wherein the user can only interact with the active dialog box until the active dialog box is closed; a modeless dialog launch modality wherein any number of dialog boxes may be open simultaneously, and wherein the user can interact with any aspect of the graphical user interface other than the active dialog box while the active dialog box is open; and a semi-modeless dialog launch modality wherein only the selected dialog box and parent dialog boxes of the selected dialog box are open simultaneously, and wherein a user can interact with selected aspects of the graphical user interface other than the active dialog box while the active dialog box is open.

In one embodiment, each dialog includes a display controller constructed and arranged to control display of and interactivity with the associated dialog box on the graphical user interface; and a command processor constructed and arranged to direct dialog box control requests received from the graphical user interface to the dialog manager and to forward dialog box control requests received from the dialog manager to the display controller. The dialog manager includes a dialog controller constructed and arranged to control the plurality of dialogs in accordance with the selected dialog launch modality, the dialog controller forwarding certain ones of the dialog control requests generated by the graphical user interface to the selected ones of the plurality of dialogs, and to selectively cause the generation of the operating system calls.

In another aspect of the present invention, an apparatus for managing the graphical user interface display and interactivity with respect to a selected one of a plurality of dialog boxes to be opened on a graphical user interface in accordance with a selected one of a plurality of dialog launch modalities is disclosed. For each of the plurality of dialog launch modalities the apparatus closes open dialog boxes not having a predetermined relationship with the selected dialog box, thereby achieving a display clarity associated with the selected dialog box modality.

In another aspect of the present invention, a dialog box control system is disclosed. The control system manages graphical user interface display and interactivity with respect to a selected one of a plurality of dialog boxes to be opened on the graphical user interface in accordance with a selected one of a plurality of dialog launch modalities. The dialog box control system includes plurality of dialog control means for controlling display of and user interaction with an associated dialog box. The control system also includes dialog management means for selectively providing selected ones of said plurality of dialogs with selected dialog box requests generated by the graphical user interface, and to selectively generate system calls to the operating system to implement said selected dialog box launch modality, each said system call causing the operating system to process certain user inputs.

In one embodiment, the dialog management means includes means for causing said plurality of dialog control means to close open dialog boxes not having a predetermined relationship with said selected dialog box; means for controlling, for each of said plurality of dialog launch modalities, user interactivity with the computer-based system beyond an active dialog box; and means for applying immediately to the computer-based system user control inputs provided to said active dialog box.

In one alternative embodiment, the plurality of dialog boxes are logically associated in a hierarchial relationship based on the location of a dialog launch display element used to launch each dialog box. In this embodiment, the dialog launch modalities include a modal dialog launch modality for which said dialog management means provides a first degree of display clarity and a first extent of system interactivity beyond said active dialog box. Also included is a semi-modeless dialog launch modality for which said dialog management means provides a second degree of display clarity substantially the same as said first degree of display clarity and a second extent of system interactivity beyond said active dialog box that is greater than said first extent of system interactivity. Included as well is a modeless dialog launch modality for which said dialog management means provides a third degree of display clarity substantially less than said first degree of display clarity and said second degree of display clarity, and a third extent of system interactivity beyond said active dialog box that is greater than said first extent of system interactivity and said second extent of system interactivity.

In a still further aspect of the invention, a method for managing a graphical user interface in a computer-based signal measurement system is disclosed. The computerbased system includes an operating system and the method is performed in response to receipt of an activation request to open a selected dialog box. In accordance with this aspect of the invention, the dialog boxes are logically related in a hierarchical manner based upon launch dependencies. The method includes (a) recursively closing all open child dialog boxes having a predetermined logical relationship with the selected dialog box; and (b) opening the selected dialog box. In one preferred embodiment, the predetermined logical relationship with the selected dialog box includes all open child dialog boxes of the selected dialog box's parent dialog box. Parent dialog boxes include all parent dialog boxes and their parents, if any, they may be open; that is, parent, grandparent, great grandparent, etc. Here, the activation request identifies the selected dialog box and a parent dialog box through which the selected dialog box was launched.

In one embodiment of this aspect of the invention, the system includes a dialog map data structure identifying the hierarchial relationship between the dialog boxes. The dialog map includes a record associated with each dialog box, each such record having a dialog pointer to a dialog that controls the display and interactivity with the dialog box. In this embodiment, step (a) includes the steps of: (1) locating first and second records in the data map associated with the selected dialog box and the parent dialog box, respectively; (2) closing each child dialog box of the selected dialog box's parent dialog box; and (3) cross-linking the first and second records, identifying the parent-child relationship established between the selected dialog box and the parent dialog box.

In another embodiment, step (2) includes the steps of: a) accessing the dialog map data structure to locate a record associated with the selected dialog box using the dialog ID provided in the activation request; and b) accessing the dialog map data structure to locate a record associated with the parent dialog box of the selected dialog box using a parent dialog ID provided in the activation request. The data map may also include, for an associated dialog box, a list of pointers to each dialog associated with dialog boxes which are child dialog boxes of the associated dialog box, along with a parent ID field for storing an identifier for the parent dialog box. In such implementations, step (3) includes the steps of: a) inserting a pointer to the dialog associated with the selected dialog box on the child list of the data map record associated with the parent dialog box; and b) setting the parent ID of the data map record associated with the selected dialog box to the identifier for the parent dialog box. Generally, the activation request is generated by the graphical user interface in response to the user selecting an associated dialog launch display element.

In an alternative embodiment, the method also includes the step of (c) closing displayed parent dialog boxes of the selected dialog box. The method provides a desired degree of display clarity and interactivity with the computer-based system. The method further comprising the steps of (d) generating a preselected one or more system calls to the operating system to provide the display clarity and degree of interactivity; and (e) processing subsequent dialog box control requests in accordance with the display clarity and degree of interactivity.

In one aspect of the invention, a method for managing dialog boxes on a computer user interface is disclosed. The method includes the steps of: (a) selecting a first dialog launch display element representing a first dialog box; (b) opening the first dialog box on the computer user interface; (c) selecting a second dialog launch display element representing a second dialog box, the second dialog launch display element is located on the opened first dialog box; (d) opening the second dialog box on the computer user interface, wherein a parent-child relationship between the first and second dialog boxes with the first dialog box being the parent dialog box and the second dialog box being the child dialog box; (e) selecting a third dialog launch display element representing a third dialog box, the third dialog launch display element not being located on either the opened first or second dialog boxes; (f) closing the second dialog box; (g) closing the first dialog box; and (h) opening the third dialog box.

In another aspect of the invention, a method for managing dialog boxes on a computer user interface is disclosed. The method includes the steps of (a) selecting a plurality of dialog launch display elements each representing a dialog box; (b) opening the plurality of represented dialog boxes; (c) selecting a dialog launch display element representing an associated desired dialog box having a logical relationship with one or more of the plurality of opened dialog boxes; (d) closing those of the plurality of open dialog boxes not having the predetermined relationship with the desired dialog box; and (e) opening the desired dialog box.

In yet another aspect of the invention, a computer program product for use with a computer system having an operating system is disclosed. The computer program product comprises a computer usable medium having embodied therein computer readable program code method steps for managing a graphical user interface in the computer system in response to a receipt of an activation request to open a selected dialog box. The dialog boxes are logically related in a hierarchical manner based upon launch dependencies, the method comprising the steps of: (a) recursively closing all open child dialog boxes having a predetermined logical relationship with the selected dialog box; and (b) opening the selected dialog box. Preferably, the predetermined logical relationship with the selected dialog box include all open child dialog boxes of the selected dialog box's parent dialog box. The activation request identifies the selected dialog box and a parent dialog box through which the selected dialog box was launched.

In certain embodiments, the system includes a dialog map data structure identifying the hierarchial relationship between the dialog boxes. The dialog map includes a record associated with each dialog box. Each such record has a dialog pointer to a dialog that controls the display and interactivity with the dialog box. In this embodiment, step (a) includes the steps of: (1) locating first and second records in the data map associated with the selected dialog box and the parent dialog box, respectively; (2) closing each child dialog box of the selected dialog box's parent dialog box; and (3) cross-linking the first and second records, identifying the parent-child relationship established between the selected dialog box and the parent dialog box. Step (2) includes the steps of: a) accessing the dialog map data structure to locate a record associated with the selected dialog box using the dialog ID provided in the activation request; and b) accessing the dialog map data structure to locate a record associated with the parent dialog box of the selected dialog box using a parent dialog ID provided in the activation request.

In a preferred embodiment, the data map includes, for an associated dialog box, a list of pointers to each the dialog associated with dialog boxes which are child dialog boxes of the associated dialog box. The dialog map also includes a parent ID field for storing an identifier for the parent dialog box. In this embodiment, step (3) includes the steps of: a) inserting a pointer to the dialog associated with the selected dialog box on the child list of the data map record associated with the parent dialog box; and b) setting the parent ID of the data map record associated with the selected dialog box to the identifier for the parent dialog box. An additional step of (4) setting the displayed flag in the record for the selected dialog box, may be included in some embodiments, along with a step of: (5) setting the permanent flag in the record for the activated dialog box when the selected dialog box is a permanent dialog box, wherein permanent dialog boxes are dialog boxes which are continually displayed on the graphical user interface and immediately apply received control inputs to the implementing computer based system.

In one aspect of the invention, a method for managing dialog boxes on a computer user interface in a computer-based signal measurement system is disclosed. The method includes the steps of: (a) selecting a first dialog launch display element representing a first dialog box; (b) opening the first dialog box on the computer user interface; (c) selecting a second dialog launch display element representing a second dialog box, the second dialog launch display element is located on the opened first dialog box; (d) opening the second dialog box on the computer user interface, wherein a parent-child relationship between the first and second dialog boxes with the first dialog box being the parent dialog box and the second dialog box being the child dialog box; (e) selecting a third dialog launch display element representing a third dialog box, the third dialog launch display element not being located on either the opened first or second dialog boxes; (f) closing the second dialog box; (g) closing the first dialog box; and (h) opening the third dialog box.

In another aspect of the invention, a method for managing dialog boxes on a computer user interface in a signal measurement system is disclosed. The method includes the steps of (a) selecting a plurality of dialog launch display elements each representing a dialog box; (b) opening the plurality of represented dialog boxes; (c) selecting a dialog launch display element representing an associated desired dialog box having a logical relationship with one or more of the plurality of opened dialog boxes; (d) closing those of the plurality of open dialog boxes not having the predetermined relationship with the desired dialog box; and (e) opening the desired dialog box.

One advantage of the present invention is that it enables the user to select the particular dialog launch modality appropriate for a particular application. Each such dialog launch modality provides a desired degree of display clarity and system interactivity beyond an active dialog box displayed on the computer user interface.

In fact, when operating in accordance with the semi-modeless dialog launch modality, the present invention provides the advantages of each of the conventional dialog launch modalities without their respective disadvantages. That is, the semi-modeless dialog launch modality enables a user to access the implementing computer-based system beyond the active dialog box while automatically closing those dialog boxes that are determined to likely be of no interest to the user since they are not logically related to the user's current selection of an active dialog box.

Another advantage of the present invention is that it enables the user to dynamically interact with the implementing computer system. The user enters control information into data entry fields of the dialog box and the information is immediately applied to the implementing system, resulting in changes which may be visualized on the graphical user interface.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 9A and 9B are a flowchart of one embodiment of the processes performed by the present invention upon receipt of an activation request.

DETAILED DESCRIPTION

Figure 1:
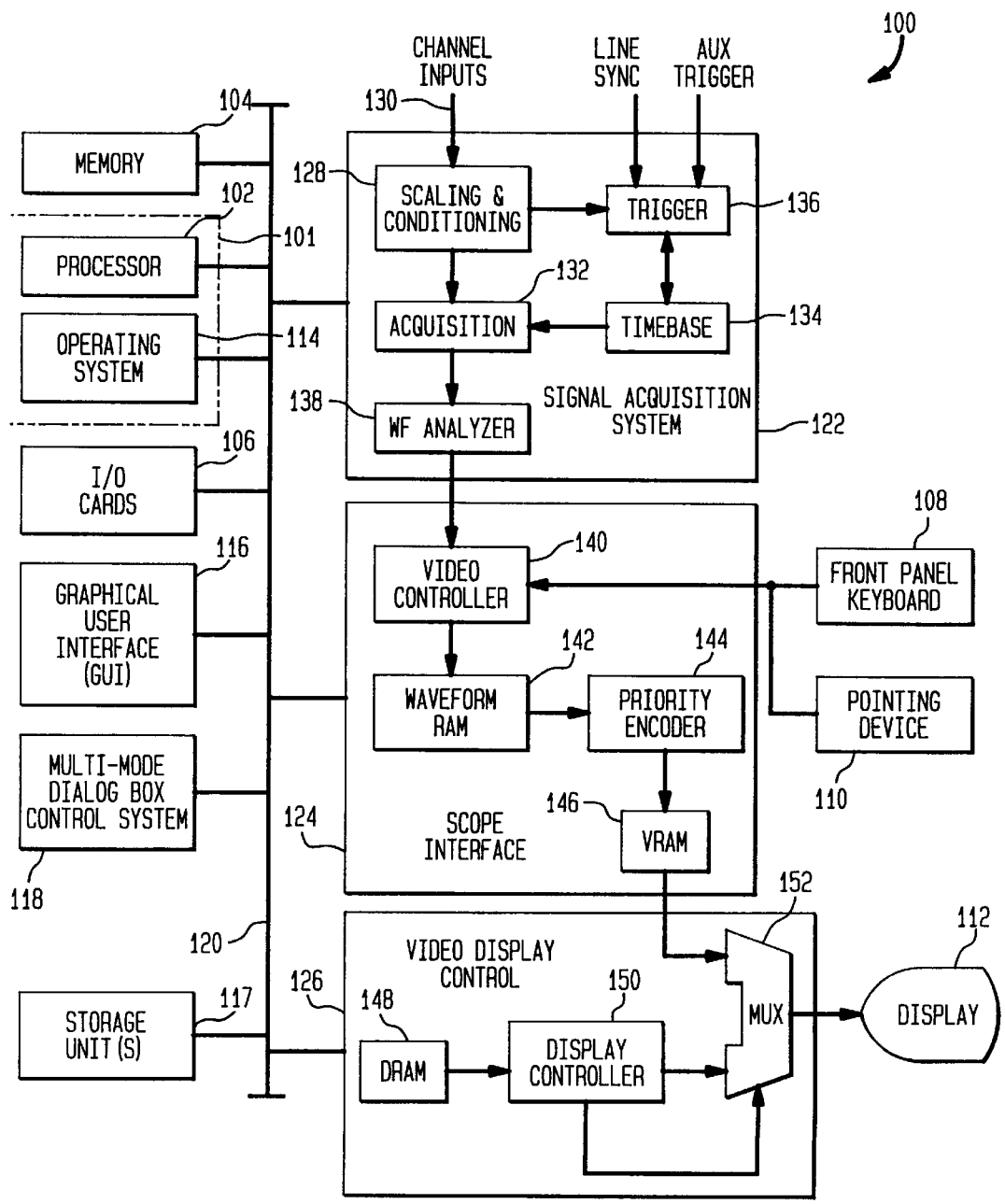
FIG. 1 is a functional block diagram of an exemplary oscilloscope suitable for implementing the multi-mode dialog box control system and methodology of the present invention.

The present invention is an apparatus and method for launching a dialog box in accordance with one of a plurality of dialog launch modalities. Each dialog launch modality has associated therewith dialog box display criteria according to which dialog boxes having a predetermined relationship with an active dialog box are displayed. A predetermined extent of user accessibility to the implementing computer-based system beyond the active dialog box is also associated with each dialog launch modality. One aspect of the present invention, hereafter referred to as a multi-mode dialog box control system, may be implemented in any computer-based system. In one preferred embodiment of the present invention, the multi-mode dialog box control system is implemented in a signal measurement system, such as a test and measurement instrument. Test and measurement instruments include, for example, digital or analog oscilloscopes, logic analyzers, network analyzers or spectrum analyzers. FIG. 1 is a functional block diagram of an exemplary digital oscilloscope suitable for implementing the present invention. FIG. 1 is a functional block diagram of an exemplary computer-based system also suitable for implementing the present invention.

Referring to FIG. 1, the digital oscilloscope 100 is a commonly-available digital oscilloscope designed to acquire, analyze, and display a wide variety of signals generally in terms of signal voltage versus time. The digital oscilloscope 100 preferably includes a general purpose computer system, which is programmable using a high-level computer programming language and specially programmed, special purpose hardware for performing signal acquisition, analysis and display functions.

The digital oscilloscope 100 includes a processor 102, a memory unit 104, input/output interface cards 106, storage units 117 such as a hard disk drive and a floppy disk drive, one or more input devices such as front panel keyboard 108 and pointing devices 110 and display 112. The memory 104 is used for storage of program instructions and for storage of results of calculations performed by the processor 102. In a preferred embodiment, the memory 104 includes random access memory (RAM). The display 112 is preferably a liquid crystal display and is logically or physically divided into an array of picture elements referred to as pixels. The inputs/output interface cards 106 may be modem cards, network interface cards, sound cards, etc.

The processor 102 is typically a commercially available processor such as the Pentium microprocessor, PowerPC microprocessor, SPARC processor, PA-RISC processor or a 68000 series microprocessor. Many other processors are also available. Such a processor usually executes a program referred to as an operating system 114 such as the various versions of the Windows operating systems from Microsoft Corporation, the NetWare operating system available from Novell, Inc., or the Unix operating system available from many vendors such as Sun Microsystems, Inc. and Hewlett-Packard Company. The operating system 114 controls the execution of other computer programs such as a graphical user interface (GUI) 116 and the dialog box control system 118, and provides scheduling, input/output control, file and data management, memory management and related services. The processor 102 and operating system 114 define a computer platform shown by dashed block 101, for which application programs and high-level programming languages are written. The functional elements of the digital oscilloscope 100 communicate with each other via one or more buses 120. The storage unit 117 may include disk drives, magnetic tape, solid state memory, bubble memory, etc.

The digital oscilloscope 100 includes a signal acquisition sub-system 122, a scope interface sub-system 124 and a video display control sub-system 126. The signal acquisition sub-system 122 includes a scaling and conditioning unit 128 that receives input signals through channel inputs 130. The scaling and conditioning unit 128 and acquisition unit 132 include well-known high frequency electronics for signal acquisition, signal conditioning and analog-to-digital conversion, all of which are controlled by the computer system 101 and are considered to be well-known in the art. The time base unit 134 drives the analog-to-digital process performed by the acquisition unit 132, specifying when to sample the input signals and the number of samples to be taken. The trigger circuitry 136 synchronizes the acquisition process through the time base 134, enabling the operator to arrange a trigger event to obtain a stable waveform display of the desired features of one or more of the input signals. Trigger circuitry 136 may be based upon a line sync or auxiliary trigger input as is well-known in the art.

The waveform analyzer 138 performs measurement processes for developing the waveform for display. The waveform analyzer 138 contains hardware and software components to perform well-known operations such as setting the analog-to-digital codes for the acquisition unit 132 and mapping the resulting digital information to the physical pixel locations which are ultimately presented on the display 112 under the control of the graphical user interface 116. The pointing device 110 and/or the keyboard 108 are used to move a cursor on the GUI-controlled display 112 to select display elements adjacent to or under the cursor. The pointing devices 110 may include any well-known pointing devices such as a mouse, track ball, joystick, touchscreen, dataglove, etc. The cursor may additionally be controlled with any one or more keyboards located externally or integrated into a front panel of the digital oscilloscope 100.

The scope interface sub-system 124 includes a video controller 140 that controls the rendering of pixels into a waveform random access memory (RAM) 142. The video control sub-system 126 also receives display element control commands and cursor input information from the front panel keyboard 108 and the pointing device 110. The waveform RAM 142 includes a data structure for each pixel location on the display 112. The data structures contain information regarding every display element that is to be drawn at each pixel location. Although there may be multiple display elements which are to be drawn at a given pixel location, only one color may be rendered at that location at any given time. The waveform RAM 142 supplies a priority encoder 144 with information regarding which display elements are to be displayed at each pixel location. The priority encoder 144 prioritizes the competing display elements. For example, if the operator arranged a marker and a waveform such that they are located in the same pixel location, then the priority encoder 144 selects that display element which has the highest predetermined priority. In such an example, the color of the marker is preferably rendered at that pixel location providing a display that appears to show the marker over the competing waveform. The priority encoder 144 then sends the selected color to the video RAM (VRAM) 146 which then causes the pixel to be rendered in the indicated color.

The video display control subsystem 126 includes a dynamic random access memory (DRAM) 148 which contains data specifying a color for each pixel in the display 112. Likewise, the VRAM 146 also contains data specifying a color for each pixel in the display 112. The computer system 101 controls the information and DRAM 148 while the signal acquisition system 122 controls the information in the VRAM 146. For each pixel in the display 112, the video display control subsystem 126 selects whether the pixel in the display 112 is to be specified from the VRAM 146 or the DRAM 148. In general, information in the VRAM 146 includes digitized waveforms being generated by the signal acquisition sub-system 122 with high rates of change which are much too fast for software processing by the computer system 101 for real-time display of the waveforms on the display 112.

The video display control sub-system 126 includes a display controller 150 and a multiplexer 152. The controller 150 controls which of the two inputs to the multiplexer 152 are processed into display signals for transmission to the display 112 under the control of the graphical user interface 116. The display controller 150 typically monitors color data send from the DRAM 148 and may be programmed to switch to multiplexer 152 to a different input once a particularly programmed color is received from the DRAM 148. A rectangular pixel area is typically defined within DRAM 148 with the programmed color. The programmed color is not displayed but instead serves as a data path switch control for the multiplexer 152. Therefore, within the programmed color rectangle, display data comes from VRAM 146. If various control functions are needed, an interactive dialog box may be drawn within the programmed color rectangle. This, as noted, prevents the information from the VRAM 146 from being displayed in the area occupied by the dialog box.

The present invention provides an efficient way to manage dialog boxes displayed in the graphical user interface 116. The multi-mode dialog box control system 118 of the present invention provides a plurality of dialog launch modalities. For each dialog launch modality, the display of dialog boxes is controlled such that only dialog box(es) having a predetermined relationship with a currently active dialog box are displayed. In a particular embodiment of the present invention, the control system 118 also provides a predetermined degree or extent of user accessibility to the implementing computer-based system beyond the currently active dialog box for each of the dialog launch modalities. This includes, for example, receiving commands at other user interfaces such as the front panel keyboard 108, enabling the user to select other dialog boxes as the active dialog box through GUI 116, or entering in data or selecting other display elements through the GUI 116. In one preferred embodiment, the dialog box control system 118 immediately applies control inputs provided to the active dialog box to the implementing computer-based system. This enables a user to dynamically interact with the implementing system, enabling visualization of the effect of selected or entered values without closing the dialog box.

In one embodiment, the dialog box control system 118 is implemented in software routines which interoperate with the components of the implementing computer-based system to perform the dialog box management functions in accordance with the present invention. Such software routines typically reside in memory 104 and/or disk storage devices 117, and may be stored on any other computer-readable medium such as, for example, magnetic disk, compact disc or magnetic tape, and may be loaded into the digital oscilloscope 100 using an appropriate peripheral device as known in the art. Preferably, this embodiment of the dialog box control system 118 is implemented in a well-known object-oriented programming language such as C++. Those skilled in the art will appreciate that different implementations, including different function names, programming languages, data structures, and/or algorithms may also be used in embodiments of the present invention other than those described below. It should be further understood that the invention is not limited to a particular computer platform, particular operating system, particular processor, or particular high level programming language, and that the hardware components identified above are given by way of example only. The dialog box control system may be implemented, for example, in dedicated hardware, firmware, or any combination thereof.

Before describing the functions and operations of the present invention, some initial concepts are presented. An exemplary graphical user interface will be described, including the manner in which dialog boxes can be launched in such an exemplary environment. Then, the manner in which dialog boxes are logically associated by the present invention is described.

As used herein, the term "dialog box" refers to any interactive window that is displayed on a computer user interface such as GUI 116 to receive control inputs through an input/output device. As noted, dialog boxes are generally special interactive windows which present logically related control input display elements that enable a user to set parameters or otherwise effect system control, including, for example, icons, select boxes, text and numeric fields, scroll bars, and others. Dialog boxes are generally presented on the user interface to enable a user to enter information and make selections, facilitating control of the operating system, application programs or other processes occurring within or accessible to the implementing computer-based system. The control inputs may be in any form, such as selection of an icon, select box, button or other display element, or entry of numeric, alphabetic or alphanumeric information into an entry field. Numerous other techniques now or later developed may be used with the present invention to display and enter information into a dialog box on a computer user interface.

In the exemplary environment described herein, dialog boxes may be temporarily as well as permanently displayed. Temporarily displayed dialog boxes are those dialog boxes which are launched through the user's selection of a launch display element on the GUI 116 or through other means external to the present invention, such as in response to the occurrence of an event in a process monitored by the implementing computer system. In accordance with one embodiment of the present invention, dialog boxes which are temporarily displayed immediately apply to the implementing computer-based system control information and selections (hereinafter, "control inputs") provided to the active dialog box. This enables the user to visualize immediately the effect of the control inputs on the controlled processes or system. This also provides a significant saving in time and cost over conventional dialog box control techniques in which dialog boxes must be appropriately closed in order for the control inputs to be applied to the process or system. Closing a dialog box in this manner (herein referred to as "selectively closed") indicates that the control inputs entered into the dialog box are to be applied to the implementing computer-based system. A dialog box may be selectively closed by the user selecting an appropriate icon, button, field or menu item. Commonly, such an appropriate selection is the selection of an "OK" or "Enter" button presented on the dialog box. Alternatively, the dialog box may be closed non-selectively, typically by selecting a "Cancel" or "Exit" button or an analogous button, selection box or icon provided on the dialog box.

Dialog boxes which are to be permanently displayed are configured to apply immediately the control information provided by the user to the implementing computer-based system in accordance with the present invention. In the exemplary computer-based system described above, for example, such dialog boxes include certain tool bars that present the user with the ability to enter specific control information at any time without having to perform a series of operations to launch a dialog box. Subsequently displayed temporary dialog boxes are preferably displayed over such permanently displayed dialog boxes.

Dialog boxes are launched or invoked in response to the selection of what is referred to herein as dialog launch display element. A dialog launch display element may be a menu item or icon on a main window display, or a display element presented on a dialog box, such as an icon, button or menu item. Typically, a dialog launch display element includes a text description followed by three dots, such as "print..." or 'save as..." in a pull-down menu or on an icon, identifying the subject matter of the dialog box that would be invoked by selecting that menu item, button or icon. For example, in the exemplary embodiment described below, dialog boxes may be invoked through the selection of launch display elements located on a main menu bar that is permanently displayed on the graphical user interface 116. Other dialog boxes are invoked through dialog launch display elements presented on the dialog boxes launched from the main menu. In one embodiment, launching dialog boxes through the invocation of a dialog launch display element located on a displayed display box results in the display of the original and selected dialog boxes. In alternative embodiments only the selected dialog box is displayed. In still further embodiments other additional dialog boxes having a predetermined relationship with the selected dialog box are also displayed.

For each dialog box there may be one or more dialog launch display elements rendered at different locations and at different times on the GUI 116. For example, a dialog box may be launched from a dialog launch display element on the main menu as well as from a dialog launch display element on another dialog box. This enables a dialog box to be designed to include dialog launch display elements to launch any related dialog box regardless of whether the dialog box is launched through other launch display elements. It should be understood that any other technique or method now or later developed for invoking or launching a dialog box is considered to be within the scope of the present invention. This includes internally-generated events, other user selection techniques, etc. Each dialog box is assigned an identifier accessible to the graphical user interface 116. In accordance with the present invention, when a dialog box is selected, the graphical user interface 116 obtains the identifier for the selected dialog box as well as the ID of the dialog box on which the launch display element selected by the user is located. These identifiers are provided to the dialog box control system 118 by the graphical user interface 116 in accordance with the present invention. In one embodiment, the identifiers are integers, although any numbers of values of any format or type may be used depending upon the application of the present invention.

In accordance with the present invention, dialog boxes are logically associated in a hierarchial relationship based on the location of the dialog launch display element used to launch the dialog box. That is, parent-child relationships are dynamically established between the displayed dialog boxes in accordance with the user's invocation selections. When a dialog box is launched through the selection of a launch display element located on another dialog box, then a parent-child relationship is created between the two dialog boxes. The dialog launch display element is located on the parent dialog box and the child dialog box is that dialog box which is invoked through that launch display element. As noted, in certain embodiments of the present invention, the parent and child dialog boxes are simultaneously displayed on the graphical user interface 116.

In accordance with the hierarchial relationship established in accordance with the present invention, the concept of a root of the dialog hierarchy is provided, analogous to a root directory in a DOS directory tree. Dialog boxes that are launched from the main menu or which are not invoked through the selection of any launch display element (that is, permanent dialog boxes) are considered to be child dialog boxes of a "root" dialog box. In other words, although the main menu is not a dialog box as defined herein, it is consider a dialog box for the purpose of establishing hierarchial relationships between all dialog boxes that may be launched through the graphical user interface 116. This approach is extended to permanently displayed dialog boxes which, as noted, are permanently displayed on the graphical user interface 116. These too, are considered to emanate from the "root" dialog box.

It should be understood that other approaches may have been taken in defining the logical relationship between the launched dialog boxes. For example, the dialog boxes may be logically associated by functional category, relationship with operations performed in the implementing computer-based system, etc.

Figure 2:
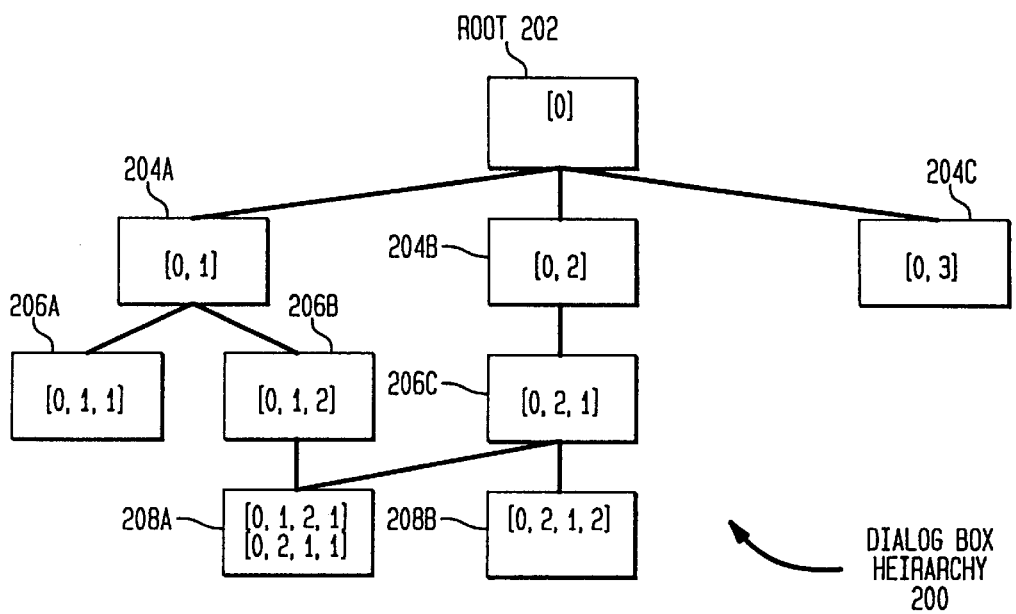
FIG. 2 is a schematic diagram illustrating an exemplary dialog box launch hierarchy created in accordance with one embodiment of the present invention.

FIG. 2 is a schematic diagram of an exemplary dialog box hierarchy created by one embodiment of the present invention. As noted, in the exemplary environment, dialog boxes are launched from the main menu and, subsequently, from other dialog boxes. In accordance with this embodiment of the present invention, the root dialog 202 is the source of all activated dialog boxes and, hence, is illustrated with a state indicator of [0].

In this exemplary dialog window hierarchy 200, three dialog boxes can be launched from the root dialog 202. That is, three dialog boxes may be launched from launch display elements available on pull-down menus available on the main menu. They are dialog boxes 304A–304C. The state indicators are [0,1], [0,2] and [0,3], respectively, illustrating that they are the first, second and third dialog boxes, respectively, that are activated through the root dialog.

From the first dialog [0,1] 204A, either of two dialog boxes can be launched: dialog box [0,1,1] 206A and dialog box [0,1,2] 206B. Similarly, from the second dialog box [0,2] 204B only one dialog box can be launched: dialog box [0,2,1] 206C. From the third dialog box [0,3] 204C, no dialog box can be launched. In this exemplary arrangement, should the dialog box 206A be activated through the selection of the launch display element located on the dialog box 204A, then a parent-child relationship is established between the two dialog boxes, with the dialog box 206A being the child dialog box of the dialog box 204A. It is noted that the illustrated state indicator is reflective is reflective of the dialog boxes that are displayed in the embodiment of the invention wherein parent dialog boxes are displayed with their child dialog boxes. As such, [0, 1, 2, 3] indicates that the third child dialog of a parent dialog that is the second child dialog of a parent dialog that is the first child dialog of the first are displayed.

From dialog box [0,1,2] 206B, a single dialog box may be launched, dialog box [0,1,2,1] 208A. From dialog box [0,2,1] 206C, two dialog boxes can be launched. They are dialog box 208A [0,2,2,1] and dialog box [0,2,1,2] 208B. As shown in FIG. 2, a single dialog box, dialog box 208A, may be launched from two different dialog boxes, dialog box 206B and dialog box 206C. As a result, when the dialog box 208A is invoked from dialog box [0,2,1] 206C, the launched dialog box has a state indicator of [0,2,1,1], and the parent-child relationship is established between dialog boxes 206C and 208A. When the same dialog box 208A is invoked from dialog box [0,2,2] 206B, the launched dialog box has a state indicator of [0,2,2,1], and the parent-child relationship is established between dialog boxes 206B and 208A.

In accordance with one embodiment of the present invention, multiple dialog box modalities are provided by the control system 118. Through the implementation of a particular modality, the display of dialog boxes having a predetermined relationship with the active dialog box are displayed for each dialog box modality. As will be explained in detail below, each of the dialog boxes in the system 100 has associated with it one such a dialog box modality. This dialog box modality is referred to herein as an assigned dialog box modality. Further, in preferred embodiments, there is a dialog box modality that is established for all dialog boxes in the implementing computer-based system. This modality, referred to as the global dialog box modality, is a user-selected or an otherwise externally provided dialog box modality. Reconciliation of the assigned dialog box modality and the global dialog modality results in what is referred to herein as a dialog launch modality for each launched dialog box. As noted, the dialog launch modality determines the manner in which the control system 118 displays and controls a selected dialog box as well as other dialog boxes. In certain preferred embodiments, the dialog launch modality also determines the extent to which the user can access the implementing system beyond the active dialog box while the active dialog box is displayed. In other words, the assigned dialog launch modality is a dialog-specific modality that, in conjunction with the global dialog box modality described below, determines the dialog launch modality defining the manner in which a user interface is managed with respect to a particular dialog box.

Figure 3A:
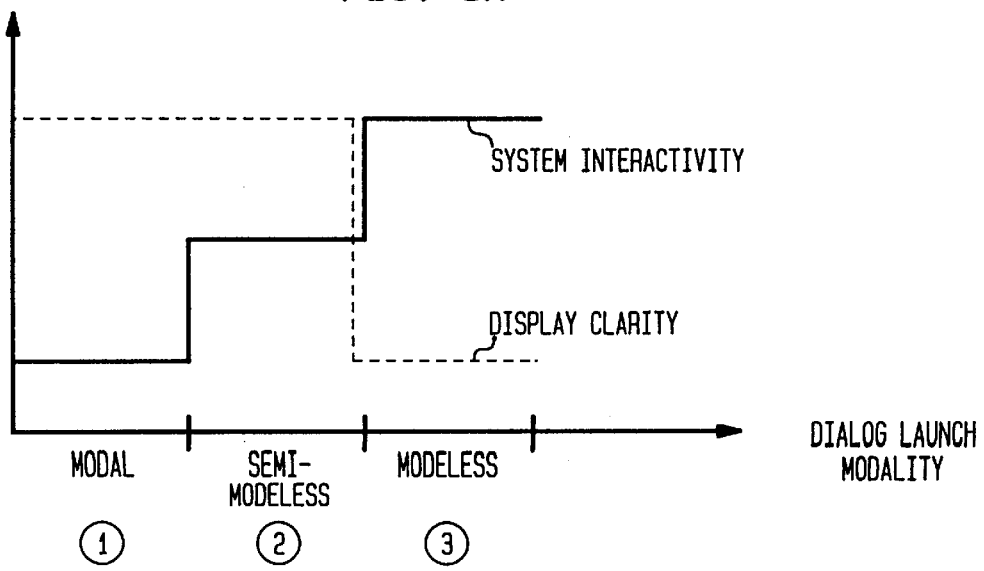
FIG. 3A is a chart illustrating the relative system interactivity and display clarity associated with multiple dialog launch modalities provided by one embodiment of the present invention.
Figure 3B:
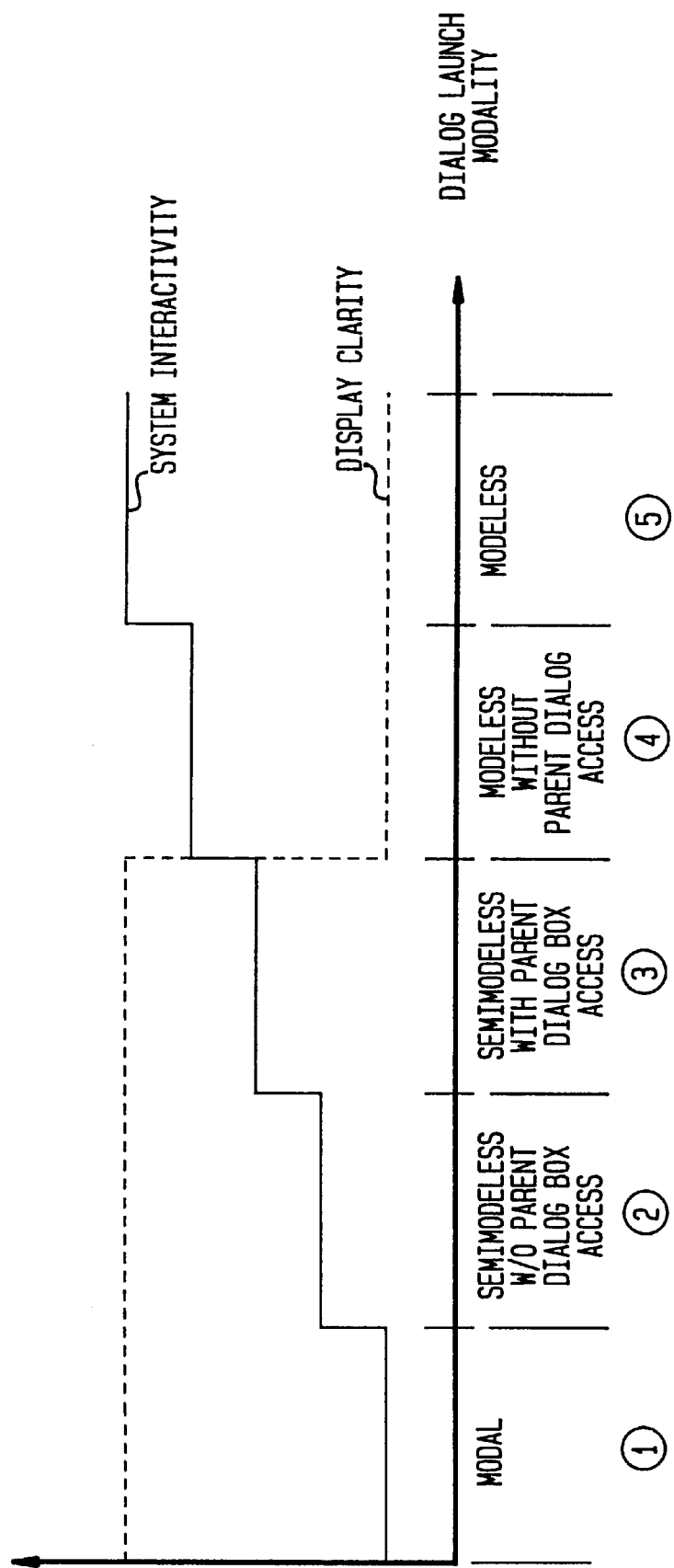
FIG. 3B is a chart illustrating the relative system interactivity and display clarity associated with multiple dialog launch modalities provided by another embodiment of the present invention.

The dialog launch modalities provided in accordance with one embodiment of the present invention are illustrated in FIG. 3A. The dialog launch modality provided in accordance with another embodiment of the present invention is illustrated in FIG. 3B.

In the embodiment illustrated in FIG. 3A, three (3) dialog launch modalities are provided. These dialog launch modalities are depicted along the horizontal axis as (1) modal; (2) semi-modeless; and (3) modeless dialog launch modalities. Each of these is described in detail below.

When a dialog box is launched in accordance with the modal dialog launch modality, the active dialog box must be closed before the user is provided access to other elements in the implementing computer-based system. Similarly, when multiple dialog boxes are displayed in a parent-child relationship, the parent dialog box, which is also displayed while the selected child dialog box is displayed, must itself must be closed after the child dialog is closed. That is, closing the child dialog box does not result in the parent dialog box being closed as well. However, the parent dialog box cannot be made the active dialog until the child dialog box is closed. If the dialog box has display elements for the user to enter control inputs, such information and selections may be applied to the implementing system immediately or not until the active child dialog box is closed. Referring to FIG. 3A, this is shown as the modal dialog launch modality having a relatively greater display clarity than the other dialog launch modalities described below, as only one dialog box and its parent dialog box(es), if any, are displayed at any given time; that is, thus, there is minimal display clutter. The modal dialog launch modality is also shown as having a relatively lower system interactivity since the user can only interact with the currently active dialog box until that dialog box is closed.

When a dialog box is activated in accordance with the modeless dialog launch modality, the user has access to other aspects of the graphical user interface 116 beyond the active dialog box without having to close the active dialog box. As a result, numerous dialog boxes may be simultaneously opened. For example, while an active dialog box is open, the user may make a menu selection that causes another dialog box to be opened. This can easily result in display clutter, particularly in computer-based systems having relatively small displays screens. In this dialog launch modality, these dialog boxes must be explicitly closed by the user. Referring to FIG. 3A, this dialog launch modality is shown as having a display clarity that is relatively lower than the modal dialog launch modality, as numerous dialog boxes are allowed to be open at any given time. On the other hand, this dialog launch modality is shown as having a relative greater system interactivity since the user can interact with any system element beyond the active dialog box while that active dialog box is opened.

In the semi-modeless dialog launch modality, when a new dialog box is launched, all existing child dialog boxes of the selected dialog box's parent dialog box are automatically closed, with all child dialog boxes of a parent dialog box being also closed in a recursive manner. This results in only the parent dialog box(es), if any, being displayed along with the selected dialog box. This significantly reduces display clutter. As will be described in detail below, in one preferred embodiment, when a dialog box is launched in accordance with the semi-modeless dialog launch modality, the user has the ability to access the displayed parent dialog box(es). This is shown in FIG. 3A as the semi-modeless dialog launch modality having a display clarity equivalent to that of the modeless dialog launch modality since the same dialog boxes are displayed in both modes. The semi-modeless dialog launch is also shown as having a system interactivity greater than the modal but less than the modeless dialog launch modality. This is explained in greater detail with reference to an example.

Referring to FIG. 2, assume that a first dialog box [0,1] 204A is selected and is active. If, while this dialog box is active, the user selects the dialog box [0,2] 204B for display while in the semi-modeless dialog launch mode. In accordance with the above embodiment of the semi-modeless dialog launch modality, all child dialog boxes (dialog box [0,1] 204A) of the selected dialog box(es) (dialog box [0,2] 204B) parent dialog box (root dialog [0] 202) are closed. Thus, only the selected dialog box [0,2] 204B, is displayed.

If in addition to selecting the dialog box [0,1] 204A, a child dialog box such as dialog box [0,2,2] 206B is selected, then both dialog boxes 204A and 206B may be opened, with the dialog box 206B being the active dialog box. If while this dialog box is active, the user selects the dialog box [0,2] 204B for display while in the semi-modeless dialog launch mode, then all child dialog boxes (dialog box [0,1] 204A and dialog box [0,2,2] 206B) of the selected dialog box(es) (dialog box [0,2] 204B) parent dialog box (root dialog box [0] 202) are closed. Since whenever a parent dialog is closed, all child dialog box(es) of that parent dialog box are also closed in a recursive manner, the child dialog box [0,2,2] 206B is closed followed by the closing of the dialog box 204A. Thus, as before, only the selected dialog box, dialog box [0,2] 204B, is displayed.

FIG. 3B illustrates the dialog launch modalities provided by another embodiment of the dialog control system 118. In this embodiment, there are five (5) dialog launch modalities: (1) modal; (2) semi-modeless without parent dialog box access; (3) semi-modeless with parent dialog box access; (4) modeless without parent dialog box access; and (5) modeless. This embodiment illustrates the flexibility of the dialog control system 118 to accommodate any desired degree of system interactivity and display clarity. Here, two semi-modeless dialog launch modes are provided. The first, shown as mode (2), does not provide user access to the displayed parent dialog box(es), if any. The other semi-modeless dialog launch modality, mode (3), does provide such access, as described above with respect to the embodiment illustrated in FIG. 3A. Thus, less system interactivity is provided by the second dialog launch modality than by the third, as illustrated by the system interactivity curve shown in FIG. 3B.

Furthermore, two modeless dialog launch modalities are provided in this exemplary embodiment. These two modeless dialog launch modalities differ with respect to parent dialog access, similar to the two semi-modeless dialog launch modalities in this embodiment. Accordingly, the fourth dialog launch modality provides less system interactivity than the fifth, a shown in FIG. 3B. The display clarity for this embodiment is similar to that of the embodiment shown in FIG. 3A. That is, the modal and semi-modeless dialog launch modalities have similar display clarity which is greater than the two modeless dialog launch modalities.

It will become apparent from the description herein that a desired degree or extent of display clarity and system interactivity may be provided by other embodiments of the present invention. For example, in one embodiment, access to permanent dialog boxes is provided by the dialog box control system 118 while an active dialog box is open. The above description regarding parent access is just one example of how system availability for particular display elements may be provided for each of the dialog launch modalities. Other display element may also be controlled in a similar fashion. In such embodiments, however, information regarding a user selection of such display elements must be provided to the dialog manager 402. It should be noted, however, that such information may not be necessary in those embodiments where the present invention is implemented in an operating system or graphical user interface. In other words, that information may be locally available to the present invention in such embodiments.

Figure 4A:
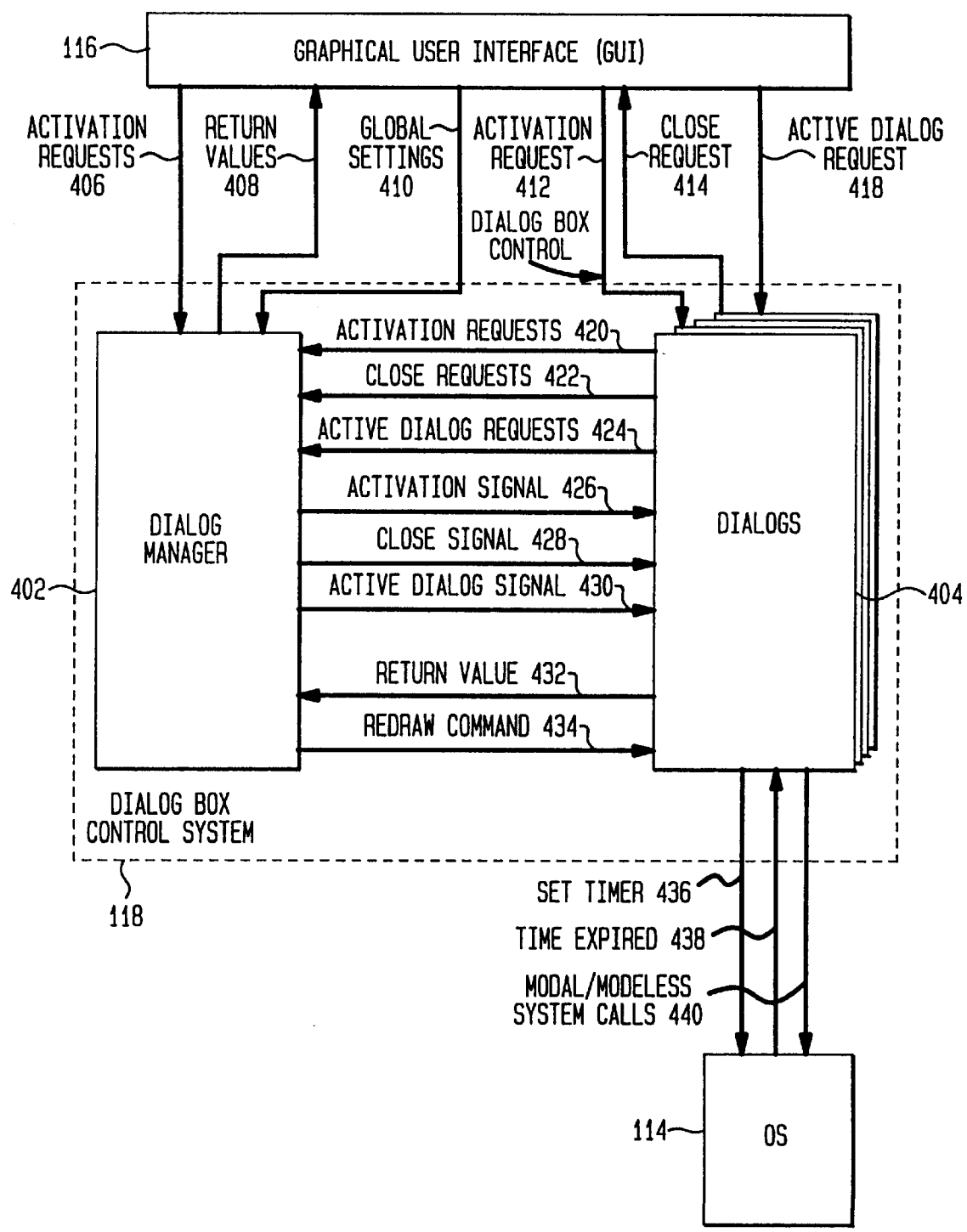
FIG. 4A is a functional block diagram of one embodiment of the dialog box control system of the present invention.

FIG. 4A is a functional block diagram of one embodiment of the dialog box control system 118 of the present invention. A preferred implementation of the system 118 is in a commonly available computer-based system having a graphical user interface and a pointing device. Control system 118 broadly includes a dialog manager 402 and a plurality of dialogs 404. Each dialog 404 is preferably a logical association of software code such as one or more modules in a structured programming language such as the C programming language. In one preferred embodiment, dialogs 404 include one or more object classes in an in an object-oriented software language, such as C++ programing language. Each dialog 404 is constructed and arranged to manage the display of, and user interactivity with, an associated dialog box.

The dialog manager 402 controls the dialogs 404 to render the dialog boxes and generate the appropriate system calls to the operating system 114 in accordance with a particular dialog launch modality. This enables the dialog box control system 118 to cause only dialog boxes having a predetermined relationship with an active dialog box to be displayed to accommodate a particular dialog launch modality. This also enables the dialog box control system 118 to provide the desired degree of user accessibility to the implementing computer-based system beyond the active dialog box in accordance with the dialog launch modality with which each dialog box is launched.

Conventional operating systems such as operating system 114 provide only a system call for each of the two conventional dialog box modalities. For example, in the Windows® operating system available from Microsoft, Inc., system calls "DoModal" and "CreateWindow" are provided. Execution of the system call "DoModal" invokes the conventional modal dialog box modality. In response to this system call, the operating system 114 prevents reception of user inputs that are not provided to the active dialog box. Execution of the system call "CreateWindow" invokes the conventional modeless dialog box modality. In response, the operating system 114 accepts user inputs that are provided to any part of the implementing computer-based system while an active dialog box is displayed. Thus, conventional operating systems provide the capability only for modal and modeless dialog box operations, as noted above.

Figure 4B:
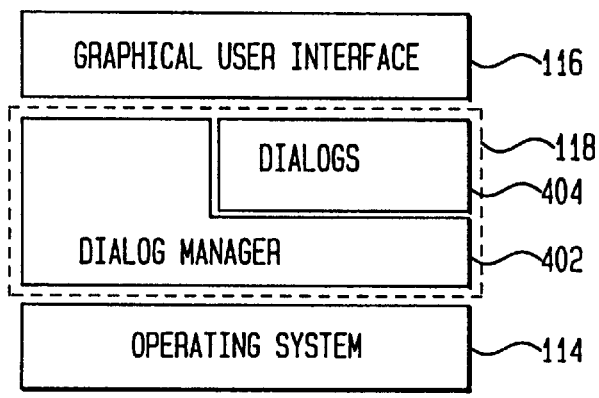
FIG. 4B is a software layer diagram of one embodiment of the dialog box control system of the present invention, implemented with a conventional operating system.

In one embodiment of the present invention, the dialog box control system 118 interoperates with a currently exiting operating system 114. In this embodiment, the dialog box control system 118 is operatively interposed between the GUI 116 and the operating system 114, controlling the generation of the system calls that are provided to the operating system 114. FIG. 4B is a software layer representation of the implementing computer-based system illustrating the relationship between one embodiment of the present invention and a graphical user interface 116 modified in accordance with the present invention and a conventional operating system 114. This arrangement enables the dialog box controller 118 to provide additional or different dialog launch modalities in accordance with different embodiments of the present invention by interoperating with the existing operating system 114.

It should be understood, however, that the exemplary embodiments illustrated in FIGS. 4A and 4B are implemented to enable the present invention to operate with a conventional operating system 114 and modified graphical user interface 116. In other embodiments, the present invention is an operating system incorporating the functionality of the present invention. In still another embodiment, a graphical user interface incorporating the functionality of the present invention is provided. Such embodiments do not require the management of commands and function calls as in the described embodiments since the functionality would be incorporated and distributed within the operating system or graphical user interface rather than communicating with them. It follows that in other alternative embodiments, the functionality of the present invention may be distributed between a graphical user interface and an operating system.

The exemplary embodiment illustrated in FIGS. 4A and 4B will now be described in detail below. The dialog box manager 402 receives global settings 410 from the graphical user interface 116. The global settings function call 410 has the following parameters: (1) global dialog modality; (2) system access; (3) dialog box timeout; (4) dialog box display options.

The global settings 410 includes the global dialog box modality noted above. In the above embodiment wherein three dialog launch modalities are provided by the present invention, the global dialog modality contains any number of values of any type and format representing one of the three modalities: modal, semi-modeless and modeless. The global dialog box modality is selected by the user or is otherwise selected or provided externally. Preferably, the global dialog modality is selectable by the user through, for example, a menu item, icon, etc.

With regard to system access parameter(s), as noted above, in one embodiment, the dialog box control system 118 provides access to the active dialog box's parent dialog box(es) to achieve a desired degree of system accessibility beyond the active dialog box. In such an embodiment, the global settings include a parameter indicating when the parent dialog box(es) is/are to be accessible by the user. As noted, implementation of such a feature eliminates the requirement that a child dialog box is to be closed prior to accessing the parent dialog box. In other embodiments, permanent dialog boxes may be accessed while a dialog box is active. In such an embodiment, the system access parameter(s) would include an indication of such.

With regard to the timeout value, in certain embodiments, the user can select or the application can predetermine a time duration during which the user must provide control inputs to an active dialog box. If there are no control inputs provided to the active dialog box during this time interval, the dialog control system 118 closes the active dialog box as described below. This timeout value is provided as part of the global settings 410.

The return value 408 provided to the graphical user interface 116 by the dialog manager 402 indicates the manner in which the dialog box is to be closed due to the expiration of the timeout value. The dialog manager 402 can indicate to the graphical user interface 116 that the dialog box is to be selectively or non-selectively closed. This will cause the GUI 116 to generate a close request 414 as described below.

The global setting function call 410 also includes a dialog box display options parameter. This parameter includes one or more values representing a style and format in which the dialog boxes are to be displayed. In one embodiment, this parameter includes a transparency variable indicating that the dialog boxes are to be rendered in one of three transparency styles: opaque, translucent, and transparent. Opaque results in dialog boxes having a background rendered in a gray color, with the dialog box obscuring anything that is behind. Transparent results in blank regions on the dialog box being rendered in a way that lets underlying waveform data to seen through the dialog box. Translucent is a semi-transparent pattern wherein the dialog box background is rendered such that every other pixel allows the waveform data to be visible. Another display option, color options, determines the colors in which the dialog boxes are rendered. In one embodiment, there are 4 variables, 2 for foreground color, and 2 for background color.

When a dialog box is selected by the user to be launched, an activation request 406 or 412 is generated by the graphical user interface 116. If the user selects a dialog launch display element from the main menu in the exemplary embodiment described above, then the activation request 406 is generated by the graphical user interface 116 for the dialog box manager 404. This is because no dialog boxes are currently displayed and, therefore, none are active. As a result, no activation request 412 can be generated by the user selecting a launch display element displayed on such a dialog box. However, if the user selects a dialog box to be launched by selecting a launch display element located on a displayed dialog box, then the activation request 412 is provided to the dialog 404 associated with that dialog box as part of the control manipulations 416.

In accordance with one aspect of the present invention, the activation request 406,412 is a function call having the following parameters: (1) dialog ID; (2) parent ID; and (3) assigned dialog modality. The dialog ID is an identifier of the dialog box represented by the selected launch display element. The parent dialog ID is an identifier that identifies the parent dialog box in accordance with the logical relationship dynamically established between the selected dialog box and the dialog box containing the selected launch display element.

The assigned dialog modality is the dialog launch modality associated with the selected dialog box. As noted, the dialog manager 402 utilizes this value along with the global dialog modality to determine the dialog launch modality for the selected dialog box. In one embodiment of the present invention, the assigned dialog modalities include modal and modeless assigned dialog box modalities. In another embodiment, the assigned dialog modality also includes a permanent dialog mode. In one noted embodiment, there are certain dialog boxes which are continually displayed on the graphical user interface 116. Preferably, these dialog boxes are displayed in a format different than temporary dialog boxes to facilitate the user's identification of their permanent nature. For example, in one exemplary embodiment, these dialog boxes are displayed without a title bar and without a close button.

Another option that may be included in the assigned dialog launch modality is a modeless-always dialog mode. This assigned dialog modality identifies a particular dialog box as requiring to be displayed in accordance with the modeless dialog launch modality. The reconciliation between the global dialog modality and the assigned dialog modality is described below.

As noted, the dialog manager 402 determines the manner in which a selected dialog box is to be displayed and controlled. This determination is based on the global dialog box modality received from the graphical user interface 116 as part of the global settings 410 and the assigned dialog launch modality in the activation request 406, 412.

Taking the embodiment described above with respect to FIG. 3A as an example, the dialog manager 402 makes the dialog launch mode determination as described below. The global dialog mode serves as a threshold for the maximum system accessibility provided to the user. In this approach, the global dialog mode overrides the assigned dialog box modalities. Thus, as shown in FIG. 3A, if the global dialog modality is set at semi-modeless, then the dialog launch modality would be semi-modeless when the assigned dialog mode is either semi-modeless or modeless. If the assigned dialog box mode is modal, then the dialog launch mode would also be modal as that provides a degree of system interactivity less than that provided by semi-modeless, as described above.

As noted, in one embodiment of the present invention, the assigned dialog mode includes a permanent dialog box mode. In this embodiment, the dialog box manager 402 does not process close requests 414 received from the associated dialog 404. It should be noted, however that such close requests would not be generated by the disclosed exemplary embodiment of the permanent dialog boxes, as they cannot be closed. As a result, there is no selection provided to the user on the graphical user interface 116 for the user to select that such dialog box should be closed. In any event, when the assigned dialog box modality is permanent, then the dialog launch mode is set to modeless to enable the user to access the other portions of the implementing computer-based system.

The modeless-only assigned dialog box mode presents an exception to the noted rule that the global dialog box mode presents a limit on the accessibility associated with the activation of a specific dialog box. When the assigned dialog box mode is modeless-only, then the dialog manager 402 enables a dialog box to be launched in a modeless dialog launch modality regardless of the user preference identified by the global dialog modality. In embodiments wherein permanent dialog boxes are implemented, the modeless-only assigned dialog box mode is assigned to such permanent dialog boxes. This enables the user to access other display elements on the graphical user interface while the permanent dialog boxes are displayed.

As noted, the illustrative embodiment of the dialog box control system 118 is interposed between the graphical user interface 116 and the operating system 114. The dialog manager 402 makes the determination as to whether a dialog box is to be activated, closed or designated as the active dialog box. As a result, all commands provided to the dialogs 404 from the graphical user interface 116 relevant to the display control of the dialogs are not immediately processed by the dialogs themselves. Instead, in accordance with this aspect of the present invention, the dialogs 404 are constructed and arranged to provide these commands or function calls to the dialog manager 402 for processing.

These commands include the control manipulations 416 which include the activation request 412 and the close request 414. These are passed to the dialog manager 402 as the activation request 420 and the close request 422. Also passed to the dialog manager 402 is an active dialog request 424 generated in response to the receipt of the active dialog request 418.

The dialog manager 402 generates three signals received by the dialogs 404 representing the results of the functions and operations performed therein. These three signals are the activation signal 426, the close signal 428 and the active dialog signal 420.

The dialogs 404 generate a set timer signal 436 to the operating system 114 setting a timer value to the time out value provided by the graphical user interface as part of the global settings 410 described above. The operating system 114 generates a time expired signal 438 when the invoked timer reaches the indicated timeout value in the set timer signal 436. This causes the dialogs 404 to generate the return value 432 to the dialog manager 402. This return value identifies the manner (selectively or non-selectively) in which the dialog should be closed, as noted above.

The dialog manger 402 provides the dialogs 404 with a redraw command 434 when the transparency or color options have been changed. The redraw command 343 cases the receiving dialog 404 to render the associated dialog on the graphical user interface 116 in accordance with such display options.

With regard to the modal/modeless system calls 440, the dialog control system 118 preferably provides a desired degree of user accessibility to the implementing computer-based system for each dialog launch modality. In such an embodiment, the dialog manager 402 provides an indication of which operating system call the dialog 404 is to generate with the launching of the selected dialog box. This information is provided to the dialog 404 as part of the activation signal 426. Thus, with each activation signal 426 to the dialogs 404, the dialog manager 402 provides an indication of one of the two above-noted system calls which are then passed on to the operating system 114 by the dialog 404 as the modal/modeless system calls 440. The operating system 114 then controls the implementing computer-based system in accordance with that system call. However, to provide any desired degree of display clarity and system interactivity, the dialog manager 402 also manages each of the dialog box control function calls 412, 414, 418 generated by the graphical user interface 116 and provided to the dialog manager 402 through the individual dialogs 404.

For example, in one embodiment of the semi-modeless dialog launch modality, the user can access parent dialog boxes. When the parent dialog box is selected by the user, an activation request 418 is received from the graphical use interface 116. The dialog 404 associated with the selected dialog box forwards an active dialog request 424 to the dialog manager 402. The dialog manager 402 then may or may not generate the active dialog signal 430 to the dialogs 404 in accordance with embodiments of the present invention. The dialogs 404 then switch the active dialog box from the previously active child dialog box to the selected parent dialog box. Since the modeless system call was previously provided to the operating system 114 when the child dialog box was originally activated, the operating system 114 will allow the user to access the now-active parent dialog box.

As one skilled in the relevant art would find apparent, other dialog box display and control operations may be provided by the dialog box manager 402. For example, specific dialog boxes can be made active under certain conditions, certain dialog boxes can be activated, etc. Furthermore, as one skilled in the relevant art would find apparent, display elements other than dialog boxes may also be controlled in accordance with the present invention. Such display elements, such as menus, icons and the like are located at other locations on the graphical user interface and could be managed in a similar fashion. In such embodiments, the dialog manger 402 would receive the appropriate function call from the GUI 116 indicating that the user has selected such an icon or menu item.

Figure 5:
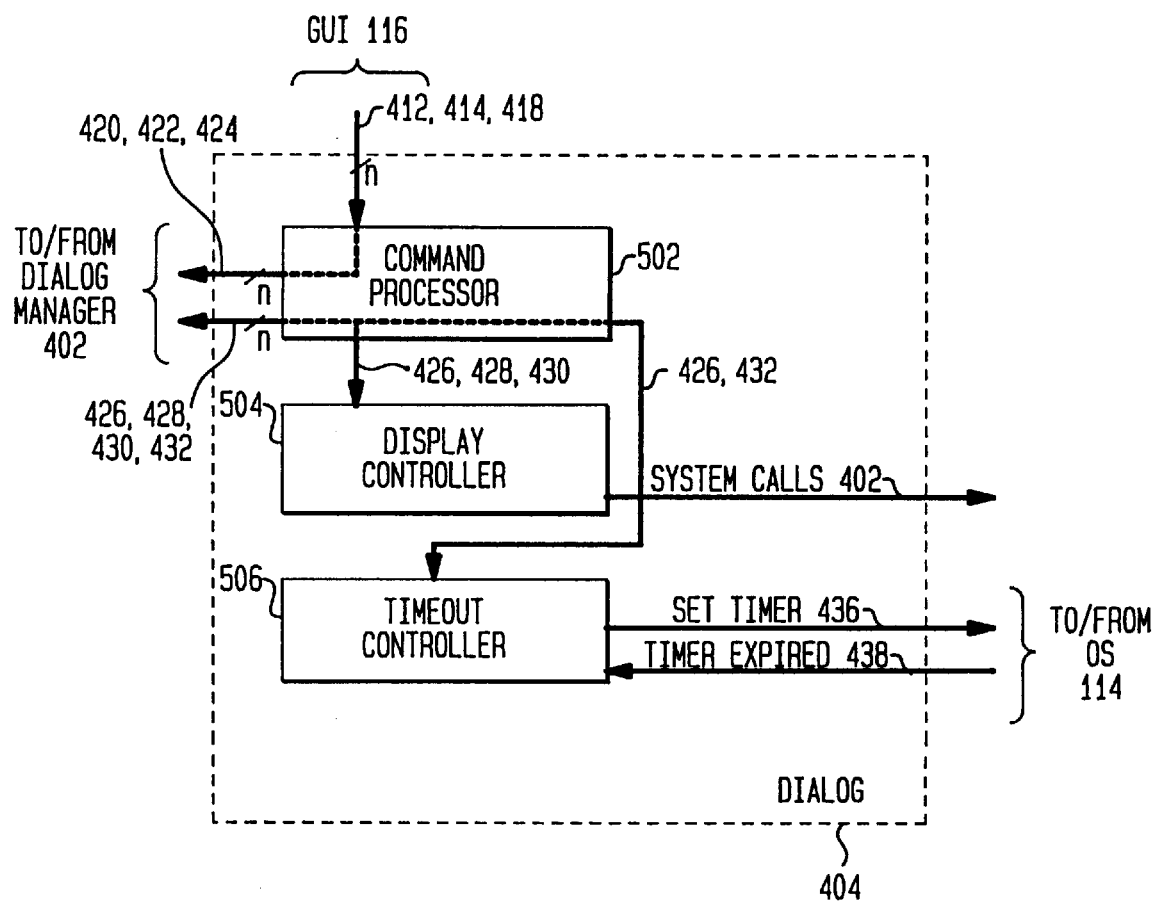
FIG. 5 is a functional block diagram of one embodiment of the dialogs implemented in the dialog box control system of the present invention.

FIG. 5 is a functional block diagram of one embodiment of the dialogs 404 of the present invention. The illustrative dialog 404 includes a command processor 502, a display controller 504 and, preferably, a timeout controller 506. The display controller 504 performs well known operations associated with the display and control of the associated dialog box on the graphical user interface 116. The structure, functions and operations of the display controller 504 is considered to be well known in the art and is therefore not described further herein.

The command processor 502 routes function calls and commands in accordance with one embodiment of the present invention. In particular, the command processor 502 receives dialog box control function calls 416 from the graphical user interface 116 as described above. The function calls 416 include the dialog box activation request 412, dialog box close request 414 and active dialog box request 418. The command processor 502 routes these function calls to the dialog manager 402 to enable the dialog manager 402 to determine which function calls should be provided to the dialogs 404 to implement a desired dialog launch modality. Once this determination is made, the dialog manager 402 forwards one or more of the above-noted signals 426–430 to the appropriate dialogs 404. The dialogs 404 then display and control their respective dialog boxes in response to the signals 426–430, managing the display and interactivity of the dialog boxes in a known manner.

In one embodiment, the dialogs 404 also include a timeout controller 506. The timeout controller 506 performs the timeout related functions described above. The timeout controller 506 receives the externally provided timeout value from the dialog manager 402, as noted above. The timeout controller 506 generates the timer signal 436 and receives the time expired signal 428 from the operating system 114. The timeout controller 506 generates the return value 432 to the dialog manager 402 through the command processor 502 when the timeout period for an active dialog box has expired. The dialog manager 402 then closes the dialog box in accordance with the present invention described below.

Alternative embodiments to the dialogs 404 may be implemented in the present invention. For example, in one embodiment, the dialog manager 402 includes the command processor 502 described above. In this or alternative embodiments the timeout controller 506 is either included in the dialog manager 402 as well or is not implemented in the control system 118. The dialogs 404, then, would only include the conventional display controller 504. As such, the dialog manager 402 would be interposed between the conventional dialog controller 404 and both the operating system 114 and the graphical user interface 116. Such embodiments of the present invention may be more appropriately implemented in other embodiments such as when the present invention is implemented in the graphical user interface 116 and/or operating system 114.

Figure 6:
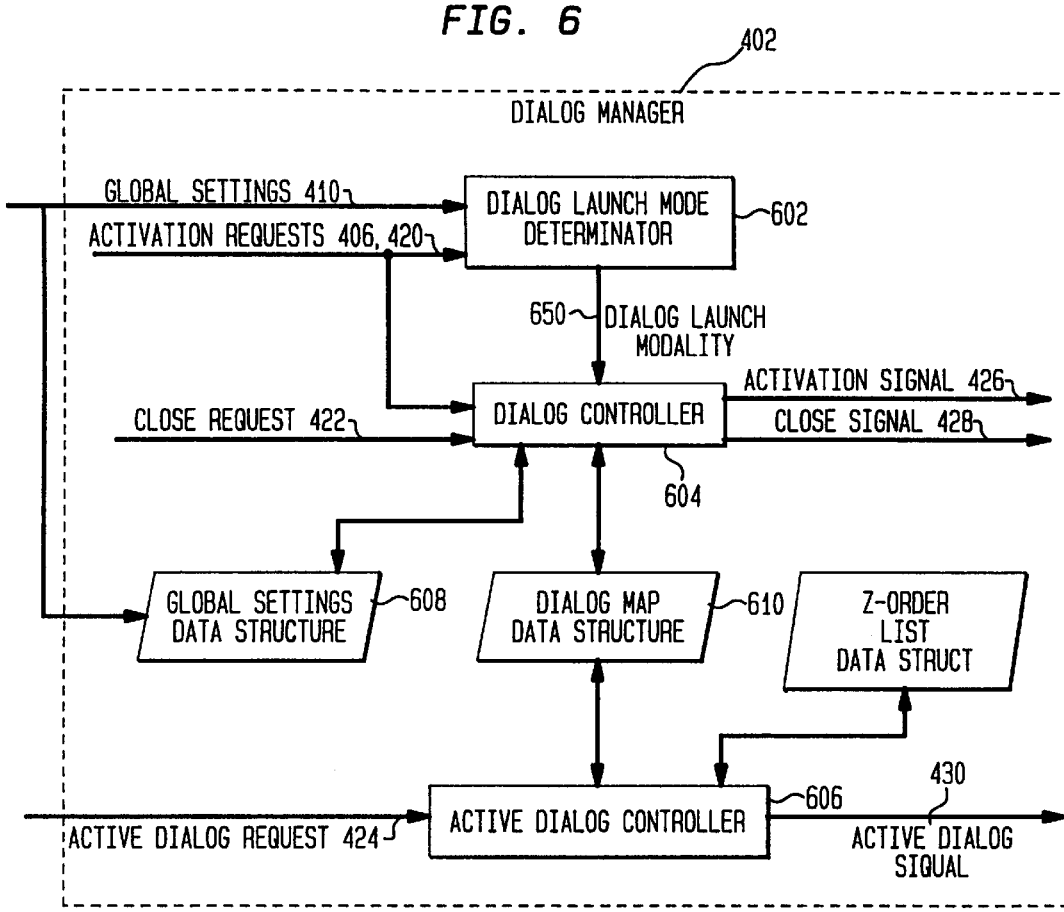
FIG. 6 is a functional block diagram of one embodiment of the dialog manager implemented in the dialog box control system of the present invention.

FIG. 6 is a detailed functional block diagram of one embodiment of the dialog manager 402 of the present invention. The dialog manager 402 primarily includes a dialog launch mode determinator 602, a dialog controller 604 and an active dialog controller 606. There are three data structures in the illustrative embodiment of the dialog manager 402, although any number may be used. These data structures are the global settings data structure 608, the dialog map data structure 610 and the Z-order list data structure 612. These data structures may take on any form, such as C++ data structures. The data structures and their contents will be described first with reference to FIGS. 7A–7C, after which the function and operation of the dialog manager 402 will be described.

Figure 7A:
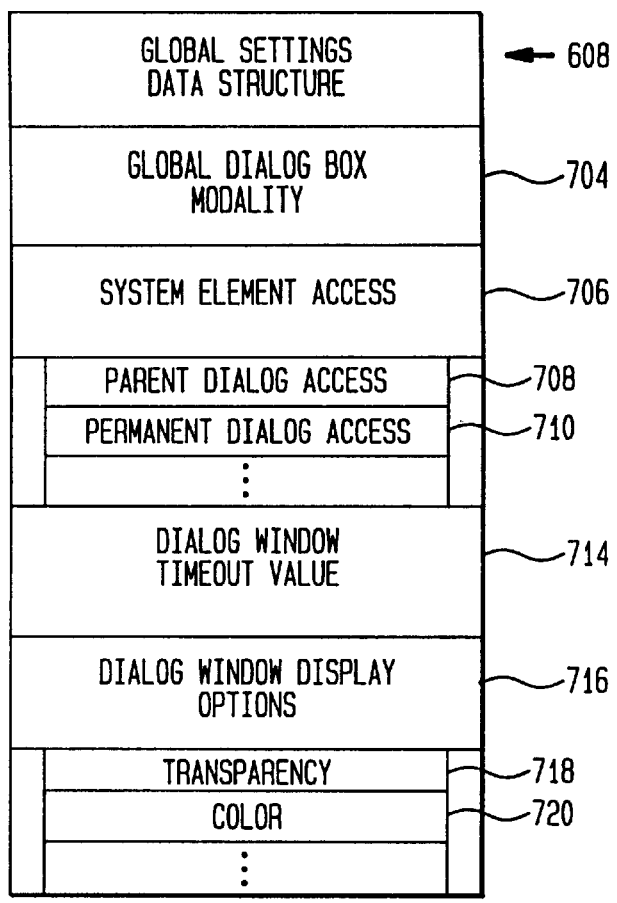
FIG. 7A is a schematic block diagram of one embodiment of the global settings data structure illustrated in FIG. 6.
Figure 7B:
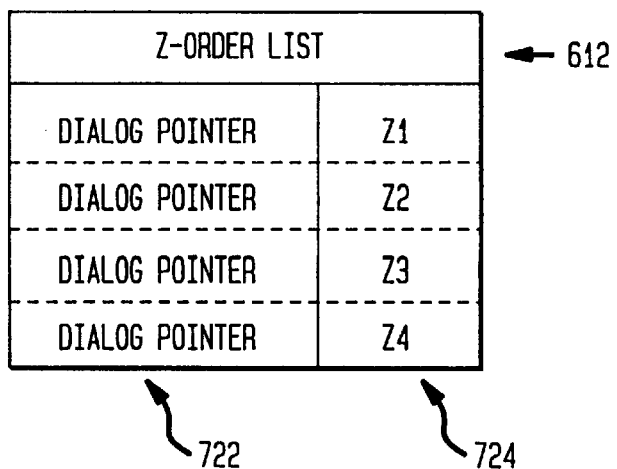
FIG. 7B is a schematic block diagram of one embodiment of the Z-order list data structure illustrated in FIG. 6.

The global settings data structure 608 primarily stores the parameters received as part of the global setting function call 410 in a generally accessible location. A schematic view of an exemplary embodiment of the global settings data structure 608 is illustrated in FIG. 7A.

The global setting data structure 608 includes a global dialog box modality field 704 wherein the above-noted global dialog modality is stored. This includes values of any desired format and type representing the global dialog modalities of the implemented embodiment. In the embodiment illustrated in FIG. 3A, for example, this would include one or more values representing the modal, semi-modeless and modeless global dialog modes. In the embodiment described above with respect to FIG. 3B, there would be representations of five global dialog modalities.

System element access field(s) 706 store one or more values that identify whether a particular element, feature or operational aspect of the implementing computer system is to be accessible by the user when an active dialog box is displayed. As noted above, in certain embodiments, the dialog manager 402 provides access to the active dialog box's parent dialog box. In such embodiments, the system element access field(s) 706 would include a value indicating whether the global settings received from the GUI 116 indicates that the selected global dialog mode should include accessing the parent dialogs. In another embodiment, permanent dialog access is provided by the dialog manager 402 when a dialog box is active. In this embodiment, a value 710 is stored in the system element access field(s) 706.

The global setting data structure 608 also includes a dialog box timeout field 714 that contains the above-noted timeout value. In one embodiment, this is an integer number in units of seconds. This value represents the timeout value received by the dialog manager 402 via the global settings function call 410.

The global setting data structure 608 also includes dialog box display options field(s) 716. Stored in fields 716 are various value(s) that are used to determine the style and format in which the dialog boxes are to be displayed. In one embodiment, the values include a transparency variable 718 that represents whether the dialog boxes should be rendered in an opaque, translucent, and transparent form. A color options variable 720 identifies the colors in which the dialogs are rendered.

Another data structure maintained by the dialog box manager 402 is the Z order list data structure 612. The Z axis is normal to the two-dimensional display screen. The Z order identifies the order of the displayed dialog boxes as they are layered on the display screen. This identifies which dialog box is visible over the other displayed dialog boxes, if any; that is, which is the active dialog box. In other words, the dialog box which has the highest Z value is on top coming out of the two-dimensional display.

The Z order list data structure 612 contains an identification 722 of all dialogs currently being managed by the dialog manager 402. Associated with each is a Z number 724 identifying the position in the visual sequence on the display screen. Typically, the Z order list data structure 612 may have anywhere from 0 to 2 or 3 entries.

Figure 7C:
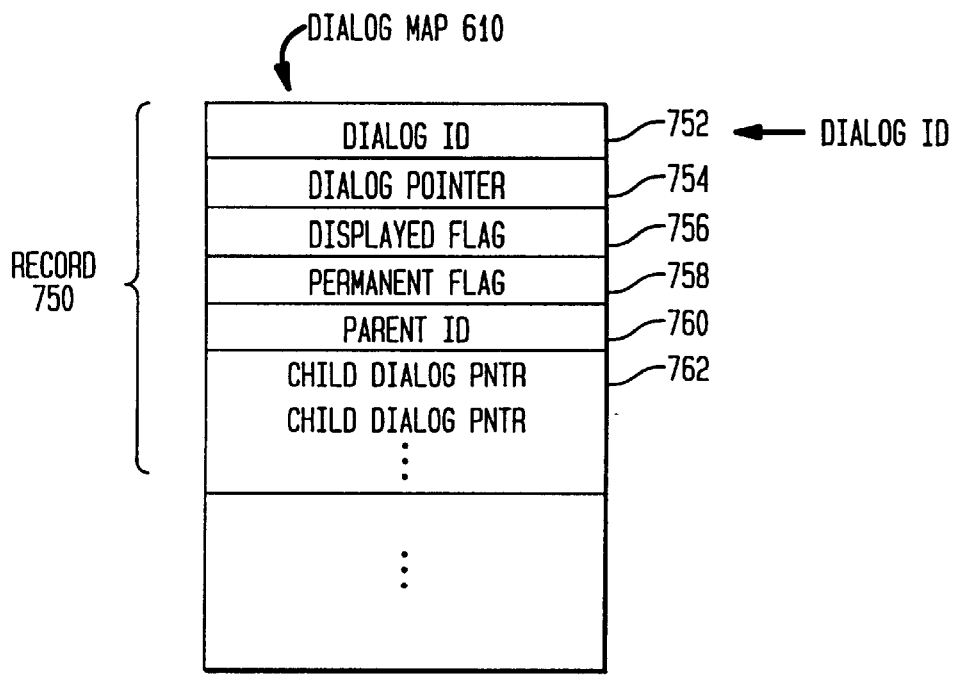
FIG. 7C is a schematic block diagram of one embodiment of the dialog map data structure illustrated in FIG. 6.

Referring to FIG. 7C, the dialog map data structure 610 includes information that identifies the logical relationship established by the present invention. In the illustrative embodiment, a hierarchical relationship is established between the dialog boxes. In each dialog box managed by the present invention, there is an entry record 750 in the dialog map data structure 610. In the illustrative embodiment shown in FIG. 7C, one such record is illustrated. Each record 750 includes a dialog ID that identifies the dialog box with which it is associated. This is the value provided to the control system 118 as part of the activation 406, 412. Each record 750 also includes a dialog pointer 754 which points to the associated dialog 404. As noted, in one preferred embodiment, the dialogs 404 are C++ class objects. Upon system initialization, the dialog manager 402 instantiates a class object for every dialog 404 in the system. The dialog manager 404 then creates each record 750 in the dialog map data structure 610. Thus, there is a single record 750 for each dialog 404 in the data structure 610. In such an embodiment, the dialog pointer 754 identifies the location of such dialog object 404. In an alternative embodiment, the dialog ID 752 noted above may have been used to identify the associated dialog 404.

A display flag 756 in the record 750 indicates whether this dialog box is currently displayed on GUI 116. In the embodiments wherein permanent dialog boxes are implemented, the data record 750 includes a permanent dialog flag 758 indicating whether the associated dialog box is a permanent or temporarily-displayed dialog box.

The parent ID 760 is the identifier of the parent dialog box from which this selected dialog box was launched. As noted, the hierarchial relationship is preferably dynamically established. The parent dialog ID may indicate the root dialog, as noted above, or a dialog box, depending on the location of the selected dialog launch display element.

The list of child dialog pointers 762 includes a pointer to each of the child dialogs of this dialog box. That is, there is a parent-child relationship established between this dialog box (as the parent dialog box) and, possibly, one or more dialog boxes (as child dialog boxes of this parent dialog box). Again, pointers are preferable, although the dialog IDs of the child dialog boxes could also be used.

According to the above implementation of the present invention, the records 750 for the parent and child dialog boxes are cross-linked through pointers to their associated dialogs 404, and through IDs for locating records in the dialog map 610.

Referring now to FIG. 6, the dialog launch mode determinator 602 receives the global dialog mode and the assigned dialog mode via the global settings function call 410 and the activation requests 406,420, respectively. The dialog launch mode determinator 602 determines the dialog launch mode 650 that governs the launching of the selected dialog box. The determinator 602 reconciles the global and assigned dialog modes in any desired manner. Once such approach was described above. Other approaches, however, are considered to be well known in the art, including the elimination of the determinator 602 and the use of one of either the assigned or global dialog modes.

Based on the dialog launch mode 650 and the activation requests 406,420 and close requests 422, the dialog controller 604 generates the appropriate activation signal 426 and close signal 428 to achieve a desired display clarity and system interactivity.

The active dialog controller 606 manages the relative location of the active dialogs on the display screen to insure that the active dialog box is visible. As noted, with the activation signal 426 the dialog manager 402 provides an indication of the system call 408 that is to be generated by the dialog controller 504. As noted, in a preferred embodiment, permanent dialog boxes are generally not displayed so as to overlay temporary dialog boxes. In one embodiment, the active dialog controller 606 places the dialog box ID of a permanent dialog box above those temporarily-displayed dialogs only when the user has selected the permanent dialog box to be the active dialog box. In alternative embodiments, the Z-order value of the permanent dialog box is never greater than that of a temporary dialog box. In such an embodiment, the temporary dialog box that has a greater Z-order value than a permanent dialog that is overlayed by such a temporary dialog box must be closed to fully visualize the underlying permanent dialog box.

Figure 8:
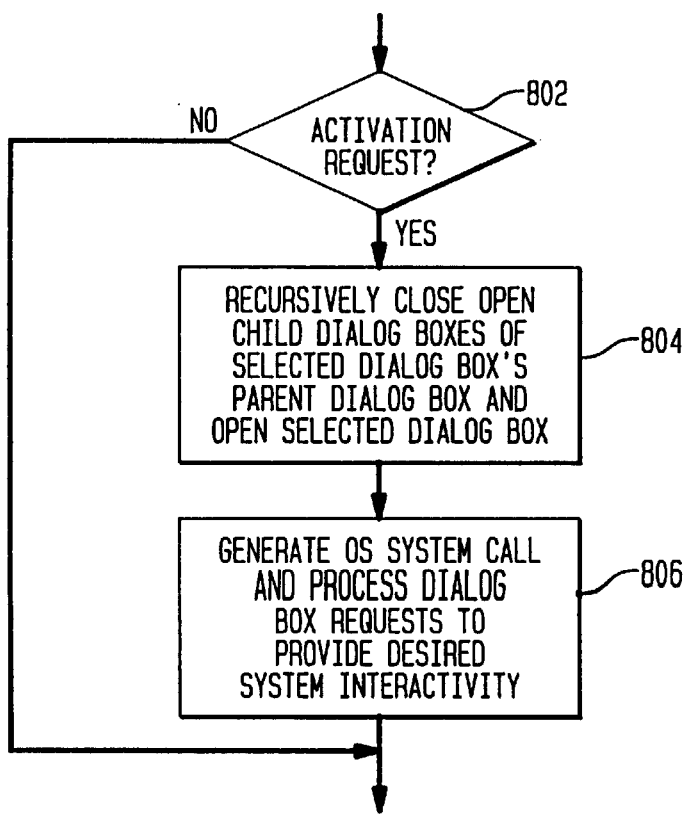
FIG. 8 is a flowchart of one embodiment of the processes performed by the dialog box control system 118 in accordance with the present invention.
Figure 9B:
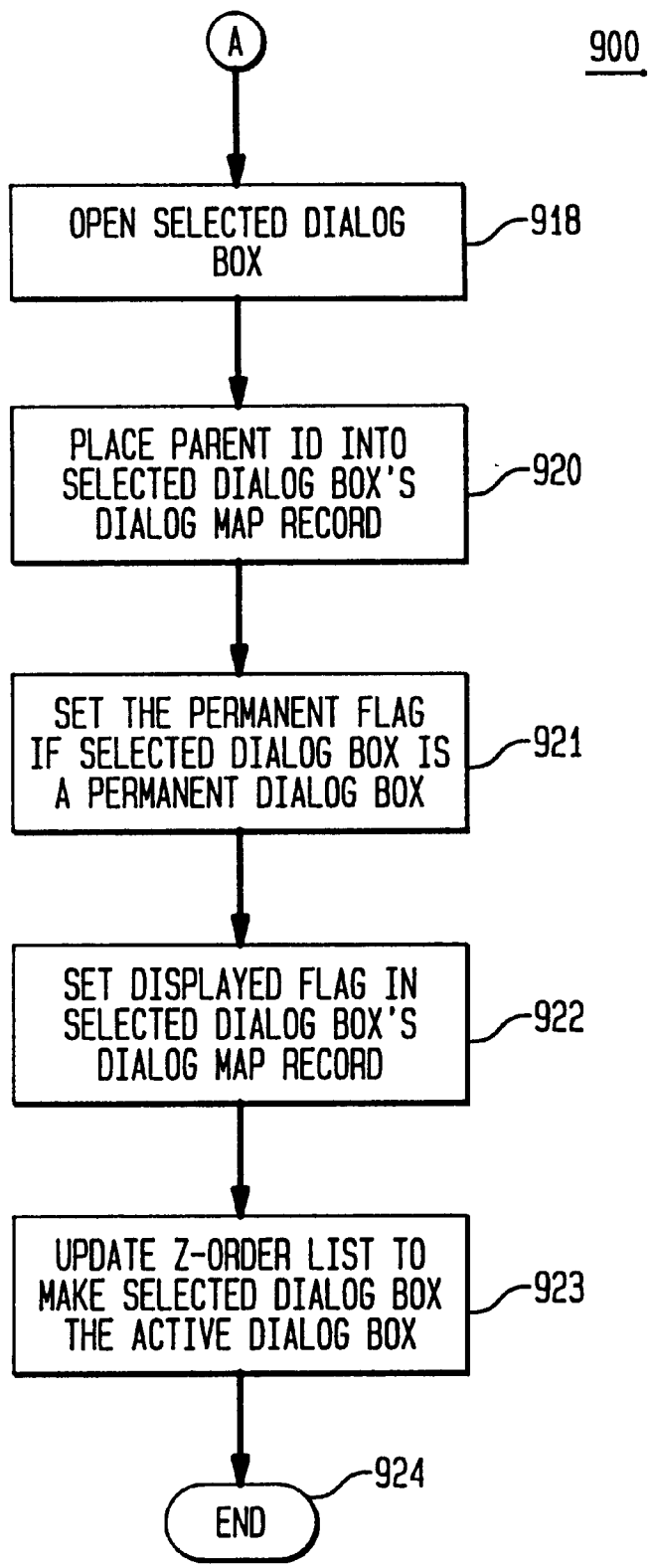
Figure 10:
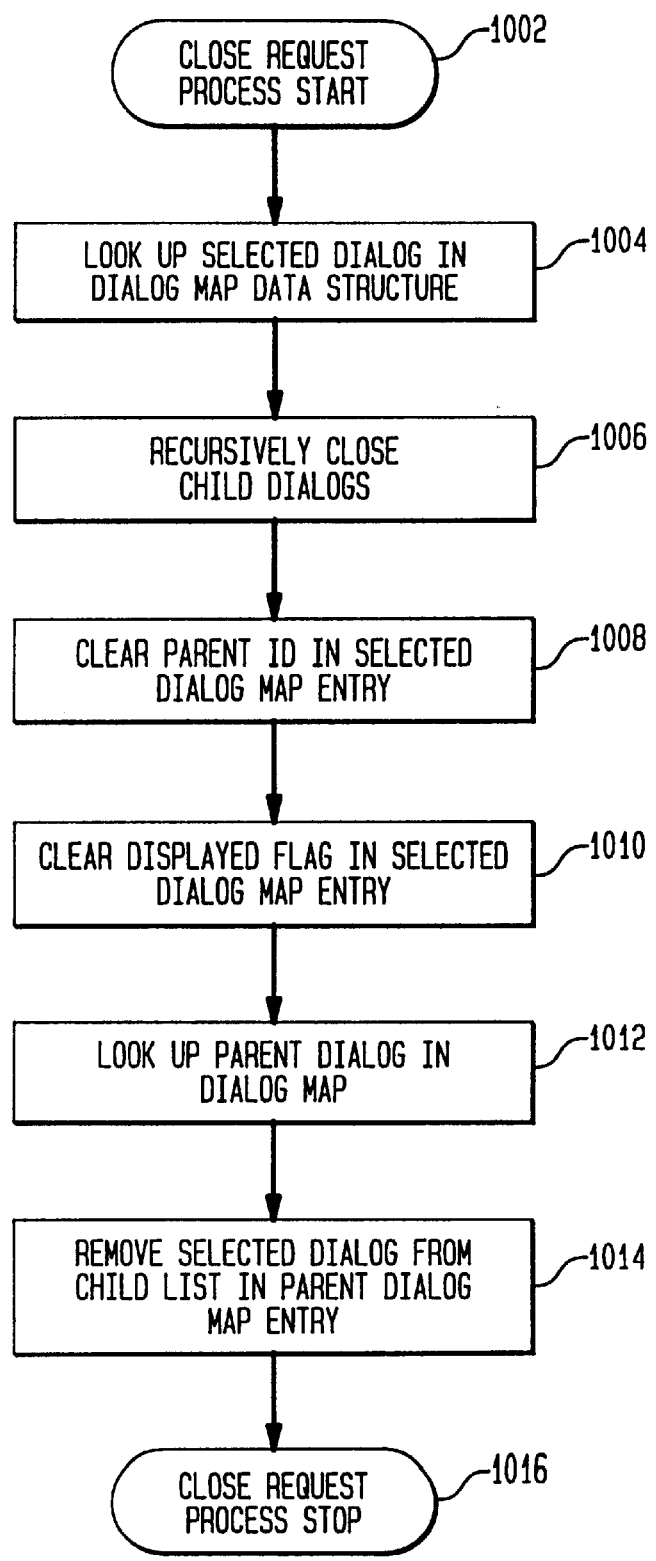
FIG. 10 is a flowchart of one embodiment of the processes performed by the present invention in response to a close request.
Figure 11:
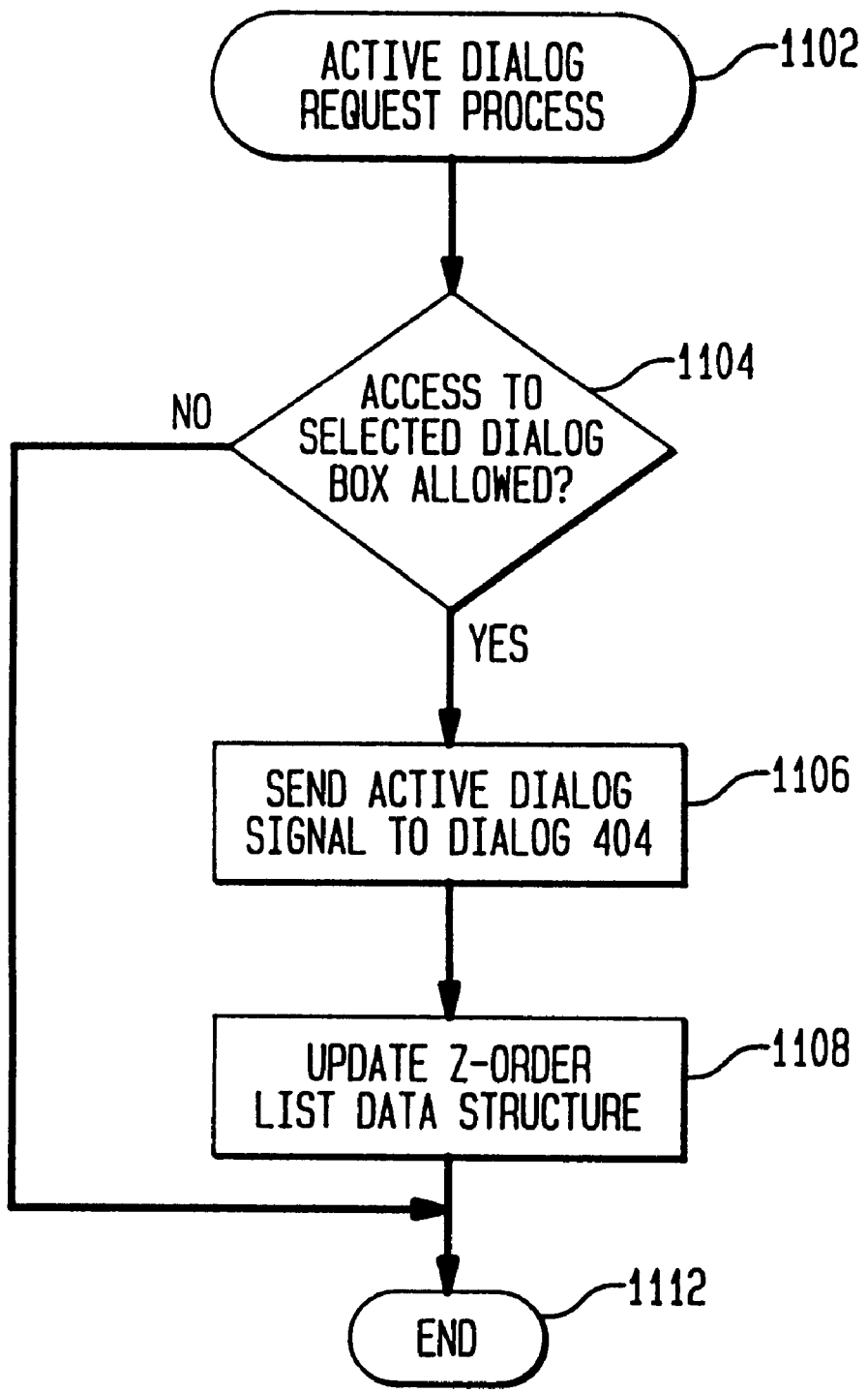
FIG. 11 is a flowchart of the processes performed by one embodiment of the present invention in response to receipt of an active dialog request.

The operation of the dialog manager 402 will now be described with reference to the flowcharts shown in FIGS. 8–10. FIG. 8 is a high level flowchart of one embodiment of the processes performed by the dialog box control system 118 in accordance with the present invention. FIGS. 9A and 9B illustrate the processes performed by the dialog manager 402 upon receipt of an activation request. FIG. 10 is a flowchart of one embodiment of the processes performed by the dialog manager 402 in response to a close request. FIG. 11 is a flowchart of the processes performed by one embodiment of the dialog manager 402 in response to receipt of an active dialog request.

Referring to FIG. 8, upon receipt of an activation request 406,412 at block 802, the dialog box control system 118 performs the processes described at block 804. In one preferred embodiment, the dialog box control system 118 also performs the processes described in relation to block 806. As one skilled in the relevant art will find apparent from the following and above descriptions, these processes may be performed in any sequence or in parallel.

At block 804, the dialog box control system 118 recursively closes all open child dialog boxes of the selected dialog box's parent dialog box. Then, the selected dialog box is opened. As noted, this results in only the parent dialog box(es) of the requested dialog box being displayed on the graphical user interface 116. This process is associated with the semi-modeless dialog launch modality described above. Alternatively, the selected dialog box is opened prior to the closing of any child dialog boxes. In one alternative embodiment, the parent dialog box(es) of the selected dialog box is/are also closed. This would result in only the selected dialog box being opened.

At block 806, the dialog box control system 118 generates the appropriate system calls to the operating system 114 and processes subsequent dialog box control requests 416 to provide a desired degree of display clarity and system interactivity. As noted, this process is particular for the above-described embodiment wherein the present invention operates with a conventional operating system 114. As such, the appropriate system call is determined based on those system calls provided by the operating system 114. In the exemplary embodiment, these are the modal and modeless system calls. The dialog box control requests 116, which include the activation, close and active dialog requests 412, 414 and 418, are then managed by the control system 118 to achieve the desired display clarity and system interactivity associated with the selected dialog launch modality, as described above.

Referring to FIGS. 9A and 9B, the processes performed by the dialog manager 402 upon receipt of an activation request 406, 420 will now be described. At block 902, the activation request process 900 begins in response to the receipt of an activation request 406, 420, typically when a dialog launch display element is selected by the user. As noted, the activation request 406,420 received by the dialog manager 402 identifies the selected dialog box and the parent dialog box through which the selected dialog box was launched.

At block 904, the dialog manager 402 locates the dialog map data structure 610 to locate the selected dialog box using the dialog ID provided in the activation request 406,420. As noted, this may be a unique identifier of or a pointer to the associated dialog 404. At block 906, the parent dialog ID in the selected dialog record 750 is cleared.

At block 908, the identifier for the parent dialog box provided in the activation request is used to locate the dialog record associated with this patent dialog box in the :23 dialog map data structure 610. Once the records for the parent and child dialog boxes have been located in the dialog map data structure 610, the dialog manager 402 then determines how it should manipulate these records based upon the dialog launch modality.

Accordingly, at block 910, the dialog manager 402 determines the dialog launch mode. If the dialog launch mode is semi-modeless, then the processes illustrated at block 912 are performed. Otherwise, processing continues at block 916.

At block 912, the dialog manager 402 closes the child dialog boxes, if any, of the parent dialog box in a recursive manner. That is, the dialog manager 402 accesses the dialog map records associated with the identified child dialogs and closes their open child dialog boxes. This process continues until all child dialog boxes are closed for the identified parent dialog box.

This includes removing the closed child dialog pointers from the respective parent dialog box's child list 762, resetting the parent ID 760, clearing the displayed flag 756 and removing the child dialog box from the display. Also, the closed dialog pointers are also removed from the Z-order list 612. This will result only in the selected dialog box's parent dialog box(es), if any, being displayed.

If the dialog manager 402 determined at block 910 that the dialog launch mode is modal or modeless, or if the processes performed at block 912 are completed, processing at block 916 is performed. At block 916, the dialog manager 402 places a pointer to the activated dialog 404 associated with the selected dialog box on the child list 762 of the parent dialog record 750. The selected dialog box is then opened at block 918 and the parent ID is placed into the parent ID field 760 of the record entry 750 for the open/activated dialog box. At block 921 the permanent flag 758 is set if the activation request 406, 420 indicates that the selected dialog box is a permanent dialog box. At block 922, the displayed flag 756 in the record 750 for the activated dialog box is set to indicate that this dialog box is displayed on the graphical user interface 116. The Z-order list 612 is updated at block 923 to include a pointer 722 to the dialog 404 associated with the selected dialog box. The Z-order value 724 is set to place the selected dialog box at the top of the display stack since it is now the active dialog box. Processing then completes at block 924.

Referring to FIG. 10, the processes performed by the dialog manager 402 in response to a close request 422 will now be described. As noted, a close request 414 is generated by the graphical user interface 116 and is received by the dialog 404 associated with the selected dialog box to be closed. That dialog 404 forwards the close request to the dialog manager 402 as close request 422. Upon receipt of the close request 422 at block 1002, the dialog manager 402 performs the processes illustrated at block 1004. Here, the dialog manager 402 accesses the dialog map data structure 610 to locate the selected dialog. The dialog manager 402 then recursively closes the child dialogs at block 1006. Once the child dialogs are closed, then the dialog manager 402 clears the parent ID 760 in the record entry 750 for the selected dialog box. The displayed flag 756 is then set false at block 1010.

The record entry 750 for the parent dialog of the selected dialog must also be updated to reflect the closing of the selected dialog box. This process is illustrated at blocks 1012 and 1014. At block 1012, the dialog manager 402 locates the record entry 750 for the parent dialog which was identified in the parent ID field 760 of the record entry for the selected dialog box. Once located, the pointer to the selected dialog box is removed from the child pointer list 762 of the record entry for the parent dialog. Processing then completes at block 1016.

Referring to FIG. 11, the processes performed by one embodiment of the present invention in response to receipt of an active dialog request will now be described. As noted, an active dialog request 418 is generated by the graphical user interface 116 when the user attempts to select a displayed dialog box. The dialog 404 associated with the selected dialog box forwards the active dialog request 418 to the dialog manager 402 as active dialog request 424. The dialog manager 402 then determines whether the selected dialog box can be made the active dialog box based upon the implemented dialog launch modality.

Upon receipt of the active dialog request 424 at block 1102, processing continues at block 1104 wherein the dialog manager 402 determines if access to the selected dialog box is allowed. As noted, this is determined in accordance with the selected dialog launch modality. If access is allowed, then processing continues at blocks 1106–1110. Otherwise, the active dialog request process ceases at block 1112.

At block 1106, the dialog manager 402 generates the active dialog signal 430 noted above. This signal 430 is provided to the dialog 404 associated with the selected dialog box. At block 1108 the dialog manager 402 updates the Z-order list data structure 612. Here, the Z-order value 724 associated with the dialog pointer 722 for the dialog 404 associated with the selected dialog box is changed to indicate that the selected dialog box is now the highest dialog box on the display and, hence, is visible to the user. Processing then completes at block 1112.

Figure 12:
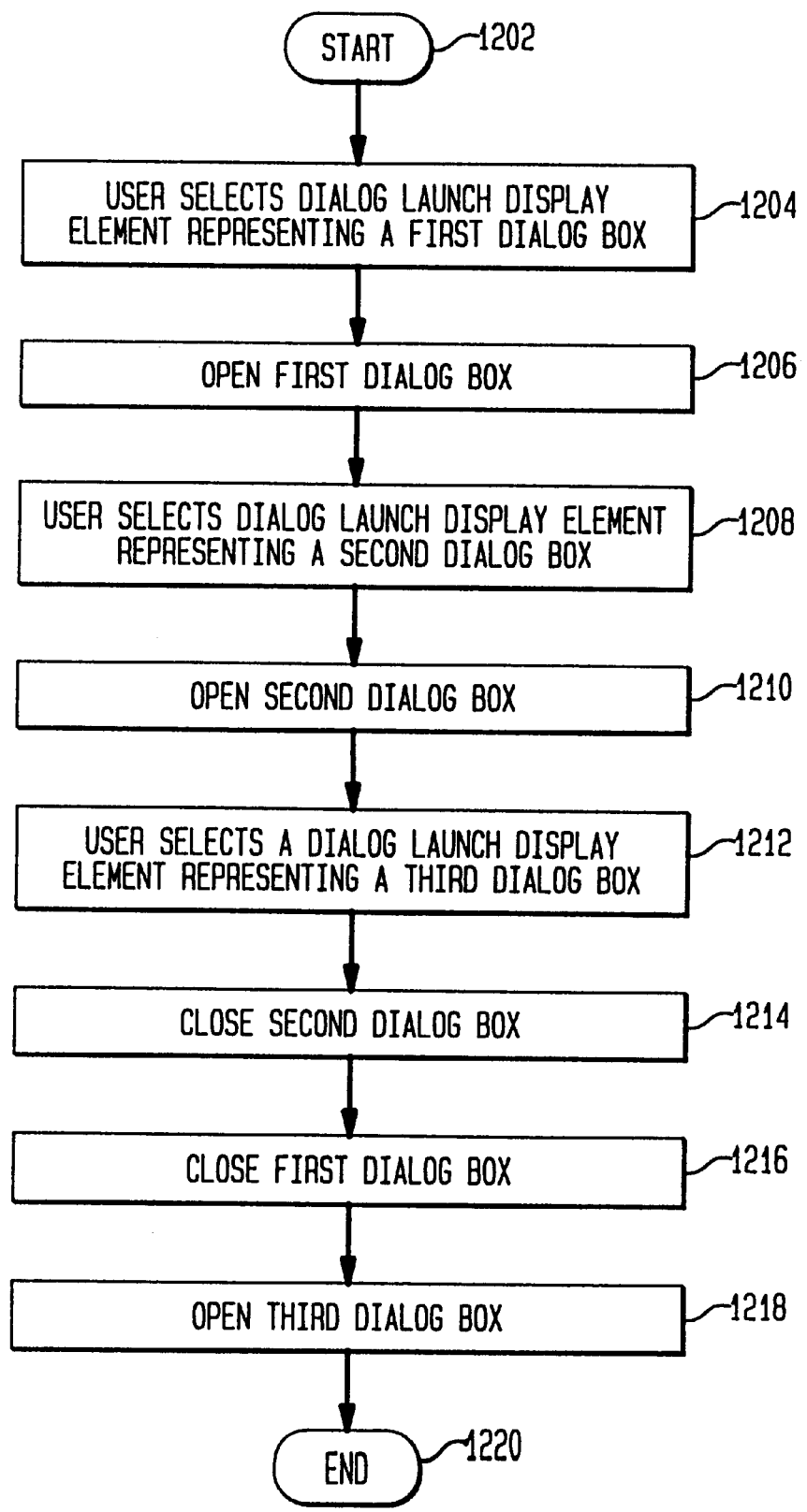
FIG. 12 is a flowchart of one embodiment of the processes performed at a computer user interface in accordance with the present invention.

FIG. 12 is a flowchart of one embodiment of the processes performed at a computer user interface in accordance with the present invention. At 1204 the user selects a dialog launch display element representing a first dialog box by manipulating a cursor on the computer user interface using a well-known pointing device. As noted, the user may select a pixel location through the pointing devices introduced above, such as a mouse, trackball, track-pad, joystick, keyboard, etc. Upon receipt of an indication of the dialog launch display elements selected by the user, the first dialog box is opened (i.e., displayed) on the computer user interface.

The user then selects a second dialog box to be opened at block 1208. In this example, the selected dialog launch display element is located on the first dialog box currently displayed on the graphical user interface 116. As before, the user makes the selection by manipulating a cursor using a pointing device as is known in the art.

In response to this selection, the second dialog box is opened at block 1210. Since this dialog box has been invoked through the selection of a dialog launch display element located on the first dialog box, a parent-child relationship between the first and second dialog boxes is created. In this relationship, the first dialog box is considered to be the parent dialog box while the second dialog box is considered to be the child dialog box. Further, the child dialog box is made the active dialog box at the completion of block 1210 as it is the last dialog box selected by the user.

The user then selects a third dialog launch display element at block 1212. Here, the selected dialog launch display element is not located on either the first dialog box or the second dialog box currently displayed on the graphical user interface. As noted, this dialog launch display element may be located virtually anywhere on the graphical user interface. For example, the dialog launch display element may be located on a pull-down menu, as an icon, etc.

In response to the selection of this third dialog launch display element, the present invention closes the second dialog box at block 1214 and the first dialog box is closed at block 1216. Subsequently to the closing of these two dialog boxes the third dialog box is opened at 1218. This processes then ceases at block 1220.

While various embodiments of the present invention have been described above, it should be understood that they have been presented by way of example only, and not limitation. For example, in the described embodiments, the parent-child relationship is determined dynamically in accordance with the location of the dialog launch display element selected by the user. In alternative embodiments, parent-child or other logical relationship between the dialog boxes may be determined and stored statically. In such an embodiment, the parent ID would be obtained by the graphical user interface and provided to the dialog box. As noted, the parent dialog boxes may or may not be displayed with a selected dialog box. This may be, for example, when the parent dialog is not needed to provide a context in which to interpret the selected dialog box. Many other alternatives are considered to be within the scope of the present invention. For example, if there are many layers of dialog boxes that can be displayed due to numerous parent-child relationships, then only certain parent dialogs may be displayed. For example, if only two levels of dialog boxes are to be displayed, when three boxes in a parent-child relationship are invoked by the user, then the highest level dialog box may not be displayed. Furthermore, if certain dialog boxes are selected, then in alternative embodiments, certain dialog boxes having a functional relationship with the selected dialog box may remain displayed on the graphical user interface as an exception to the semi-modeless dialog launch mode operations described above. In such an embodiment, the display clarity is sacrificed in order to display all functionally-related dialog boxes that have been recently selected by the user. Thus, the breadth and the scope of the present invention are not limited by any of the above exemplary embodiments, but are defined only in accordance with the following claims and their equivalents.

What is claimed is:

1. A signal measurement system having a user interface comprising:

a dialog box control system constructed and arranged to manage user interface display and interactivity of a selected one of a plurality of dialog boxes to be opened on the user interface in accordance with a selected one of a plurality of dialog launch modalities, wherein for each of said plurality of dialog launch modalities said dialog box control system closes open dialog boxes not having a predetermined relationship with said selected dialog box, thereby achieving a display clarity associated with said selected dialog box modality, and controls user interactivity with the user interface beyond an active dialog box, thereby achieving an extent of system interactivity associated with said selected dialog box modality.

2. The signal measurement system of claim 1, wherein said dialog box control system applies immediately to the signal measurement system control inputs provided to said active dialog box.

3. The signal measurement system of claim 1, wherein said dialog box control system comprises:

a plurality of dialogs each constructed and arranged to control display of and interaction with an associated dialog box; and a dialog manager constructed and arranged to selectively provide selected ones of said plurality of dialogs with dialog box control requests generated by the user interface, and to selectively cause the generation of selected system calls to an operating system of the signal measurement system to implement said selected dialog launch modality, each said system call causing the operating system to process certain user inputs.

4. The signal measurement system of claim 3, wherein said plurality of dialog boxes comprises:

a plurality of temporary dialog boxes each of which is opened in response to user selection of a representative launch display element displayed on the user interface.

5. The signal measurement system of claim 4, wherein one or more of said plurality of temporary dialog boxes is opened in response to an occurrence of one or more events.

6. The signal measurement system of claim 4, wherein said plurality of dialog boxes further comprises:

one or more permanent dialog boxes that are permanently displayed on the user interface, wherein said dialog manager causes control inputs provided to said one or more permanent dialog boxes to be applied immediately to the signal measurement system.

7. The signal measurement system of claim 4, wherein said dialog manager causes control inputs provided to said one or more temporary dialog boxes to be applied immediately to the signal measurement system.

8. The signal measurement system of claim 4, wherein said dialog launch display element is a menu item.

9. The signal measurement system of claim 4, wherein said dialog launch display element is an icon.

10. The signal measurement system of claim 4, wherein said dialog launch display element is a display element displayed on a dialog box.

11. The signal measurement system of claim 4, wherein said representative dialog launch display element is one of a plurality of representative dialog launch display elements.

12. The signal measurement system of claim 4, wherein the plurality of dialog boxes are logically associated in a hierarchical relationship based on the location of said representative dialog launch display element used to launch each dialog box, and further wherein said dialog launch modalities comprise:

a modal dialog launch modality for which said dialog box control system provides a first degree of display clarity and a first extent of system interactivity beyond said active dialog box.

13. The signal measurement system of claim 12, wherein said dialog launch modalities further comprise:

a semi-modeless dialog launch modality for which said dialog box control system provides a second degree of display clarity substantially the same as said first degree of display clarity and a second extent of system interactivity beyond said active dialog box that is greater than said first extent of system interactivity.

14. The signal measurement system of claim 13, wherein said dialog launch modalities further comprise:

a modeless dialog launch modality for which said dialog box control system provides a third degree of display clarity substantially less than said first degree of display clarity and said second degree of display clarity and a third extent of system interactivity beyond said active dialog box that is greater than said first extent of system interactivity and said second extent of system interactivity.

15. The signal measurement system of claim 4, wherein the plurality of dialog boxes are logically associated in a hierarchical relationship based on the location of the dialog launch display element used to launch each dialog box, said hierarchical relationship defining parent-child relationships between said plurality of dialog boxes, and further wherein said dialog launch modalities comprise:

a modal dialog launch modality wherein only the selected dialog box and its parent dialog boxes are open simultaneously, and wherein the user can only interact with said active dialog box until said active dialog box is closed;

a modeless dialog launch modality wherein any number of dialog boxes may be open simultaneously, and wherein the user can interact with any aspect of the user interface other than the active dialog box while the active dialog box is open; and a semi-modeless dialog launch modality wherein only the selected dialog box and parent dialog boxes of the selected dialog box are open simultaneously, and wherein a user can interact with selected aspects of the user interface other than the active dialog box while the active dialog box is open.

16. The signal measurement system of claim 15, wherein said selected aspects of the user interface comprise:

one or more open parent dialog boxes of said selected dialog box.

17. The signal measurement system of claim 15, wherein said selected aspects of the user interface comprise:

one or more permanent dialog boxes.

18. The signal measurement system of claim 15, wherein said parent-child relationship is determined dynamically.

19. The signal measurement system of claim 15, wherein said parent-child relationship is determined statically.

20. The signal measurement system of claim 3, wherein each of said plurality of dialogs comprises:

a display controller constructed and arranged to control display of and interactivity with said associated dialog box on the user interface; and a command processor constructed and arranged to direct dialog box control requests received from the user interface to said dialog manager and to forward dialog box control requests received from the dialog manager to said display controller, wherein each said display controller controls said associated dialog box in accordance with said received dialog box requests.

21. The signal measurement system claim 20, wherein said dialog manager comprises:

a dialog controller constructed and arranged to control said plurality of dialogs in accordance with said selected dialog launch modality, said dialog controller forwarding certain ones of said dialog control requests generated by said user interface to said selected ones of said plurality of dialogs, and to selectively cause said generation of said operating system calls.

22. The signal measurement system of claim 21, wherein said dialog box requests comprise:

a dialog box activation request to open a dialog box;

a dialog box close request to close a dialog box; and an active dialog box request to assign a dialog box to an active dialog box.

23. The signal measurement system claim 21, wherein said dialog manager further comprises:

a dialog launch modality determinator constructed and arranged to determine said selected dialog launch modality, wherein said dialog launch modality determinator reconciles a global dialog modality representing a dialog launch modality assigned to the signal measurement system and an assigned dialog modality assigned to said selected dialog box in accordance with predetermined selection criteria.

24. The signal measurement system of claim 23, wherein said global dialog modality is selected by the user.

25. The signal measurement system of claim 23, wherein said global dialog modality is provided externally.

26. The signal measurement system of claim 3, wherein each of said plurality of dialogs comprises one or more object classes in an object-oriented software language.

27. The signal measurement system of claim 3, wherein said system calls comprise:

a first system call, the operating system responding to said first system call by preventing reception of user inputs that are not provided to said active dialog box; and a second system call, the operating system responding to said second system call by accepting user inputs that are provided to any part of the signal measurement system while said active dialog box is open.

28. The signal measurement system of claim 1, wherein the signal measurement system is a logic analyzer.

29. The signal measurement system of claim 1, wherein the signal measurement system is a test and measurement instrument.

30. The signal measurement system of claim 1, wherein the signal measurement system is a digital oscilloscope.

31. In a computer-based system having an operating system and a user interface, an apparatus for managing the user interface display and interactivity with respect to a selected one of a plurality of dialog boxes to be opened on the user interface in accordance with a selected one of a plurality of dialog launch modalities, wherein for each of said plurality of dialog launch modalities said apparatus closes open dialog boxes not having a predetermined relationship with said selected dialog box, thereby achieving a display clarity associated with said selected dialog box modality, and controls user interactivity with the computer-based system beyond an active dialog box, thereby achieving an extent of system interactivity associated with said selected dialog box modality.

32. The apparatus of claim 31, wherein said apparatus applies immediately to the computer-based system control inputs provided to said active dialog box.

33. The apparatus of claim 31, comprising:

a plurality of dialogs each constructed and arranged to control display of and interaction with an associated dialog box; and a dialog manager constructed and arranged to selectively provide selected ones of said plurality of dialogs with dialog box control requests generated by the user interface, and to cause the generation of selected system calls to the operating system to implement said selected dialog launch modality, each said system call causing the operating system to process certain user inputs.

34. The apparatus of claim 33, wherein said plurality of dialog boxes comprises:

a plurality of temporary dialog boxes each of which is opened in response to user selection of representative launch display on the user interface and which is closed.

35. The apparatus of claim 34, wherein each of said plurality of temporary dialog boxes is closed by one of selectively or non-selectively.

36. The apparatus of claim 35, wherein one or more of said plurality of temporary dialog boxes is opened in response to an occurrence of one or more events.

37. The apparatus of claim 34, wherein said plurality of dialog boxes further comprises:

one or more permanent dialog boxes that are permanently displayed on the user interface, wherein said dialog manager causes control inputs provided to said one or more permanent dialog boxes to be applied immediately to the computer-based system.

38. The apparatus of claim 34, wherein said dialog manager causes control inputs provided to said one or more temporary dialog boxes to be applied immediately to the computer-based system.

39. The apparatus of claim 34, wherein said representative dialog launch display element is one of a plurality of representative dialog launch display elements.

40. The apparatus of claim 34, wherein the plurality of dialog boxes are logically associated in a hierarchial relationship based on the location of said representative dialog launch display element used to launch each dialog box, and further wherein said dialog launch modalities comprise:

a modal dialog launch modality for which said apparatus provides a first degree of display clarity and a first extent of system interactivity beyond said active dialog box.

41. The apparatus of claim 40, wherein said dialog launch modalities further comprise:

a semi-modeless dialog launch modality for which said apparatus provides a second degree of display clarity substantially the same as said first degree of display clarity and a second extent of system interactivity beyond said active dialog box that is greater than said first extent of system interactivity.

42. The apparatus of claim 41, wherein said dialog launch modalities further comprise:

a modeless dialog launch modality for which said apparatus provides a third degree of display clarity substantially less than said first degree of display clarity and said second degree of display clarity and a third extent of system interactivity beyond said active dialog box that is greater than said first extent of system interactivity and said second extent of system interactivity.

43. The apparatus of claim 34, wherein the plurality of dialog boxes are logically associated in a hierarchical relationship based on the location of the dialog launch display element used to launch each dialog box, said hierarchical relationship defining parent-child relationships between said plurality of dialog boxes, and further wherein said dialog launch modalities comprise:

a modal dialog launch modality wherein only the selected dialog box and its parent dialog boxes are open simultaneously, and wherein the user can only interact with said active dialog box until said active dialog box is closed;

a modeless dialog launch modality wherein any number of dialog boxes may be open simultaneously, and wherein the user can interact with any aspect of the user interface other than the active dialog box while the active dialog box is open; and a semi-modeless dialog launch modality wherein only the selected dialog box and parent dialog boxes of the selected dialog box are open simultaneously, and wherein a user can interact with selected aspects of the user interface other than the active dialog box while the active dialog box is open.

44. The apparatus of claim 43, wherein said selected aspects of the user interface comprise:
one or more open parent dialog boxes of said selected dialog box.

45. The apparatus of claim 43, wherein said selected aspects of the user interface comprise:
one or more permanent dialog boxes.

46. The apparatus of claim 33, wherein each of said plurality of dialogs comprises:
a display controller constructed and arranged to control display of and interactivity with said associated dialog box on the user interface; and
a command processor constructed and arranged to direct dialog box control requests received from the user interface to said dialog manager and to forward dialog box control requests received from the dialog manager to said display controller.

47. The apparatus claim 46, wherein said dialog manager comprises:
a dialog controller constructed and arranged to control said plurality of dialogs in accordance with said selected dialog launch modality, said dialog controller forwarding certain ones of said dialog control requests generated by said user interface to said selected ones of said plurality of dialogs, and to selectively cause said generation of said operating system calls.

48. In a computer-based system having an operating system and a user interface, a dialog box control system for managing user interface display and interactivity with respect to a selected one of a plurality of dialog boxes to be opened on the user interface in accordance with a selected one of a plurality of dialog launch modalities, the dialog box control system comprising:
a plurality of dialog control means each for controlling display of and user interaction with an associated dialog box; and
dialog management means for selectively providing selected ones of said plurality of dialogs with selected dialog box requests generated by the user interface, and to selectively generate system calls to the operating system to implement said selected dialog box launch modality, each said system call causing the operating system to process certain user inputs, wherein for each of said plurality of dialog launch modalities said dialog management means closes open dialog boxes not having a predetermined relationship with said selected dialog box and controls user interactivity with the computer-based system beyond an active dialog box.

49. The dialog box control system of claim 48, wherein for each of said plurality of dialog launch modalities said dialog management means applies immediately to the computer-based system user control inputs provided to said active dialog box.

50. The dialog box control system of claim 49, wherein said plurality of dialog boxes are logically associated in a hierarchical relationship based on the location of a dialog launch display element used to launch each dialog box, and further wherein said dialog launch modalities comprise:
a modal dialog launch modality for which said dialog management means provides a first degree of display clarity and a first extent of system interactivity beyond said active dialog box.

51. The dialog box control system of claim 50, wherein said dialog launch modalities further comprise:
a semi-modeless dialog launch modality for which said dialog management means provides a second degree of display clarity substantially the same as said first degree of display clarity and a second extent of system interactivity beyond said active dialog box that is greater than said first extent of system interactivity.

52. The dialog box control system of claim 51, wherein said dialog launch modalities further comprise:
a modeless dialog launch modality for which said dialog management means provides a third degree of display clarity substantially less than said first degree of display clarity and said second degree of display clarity, and a third extent of system interactivity beyond said active dialog box that is greater than said first extent of system interactivity and said second extent of system interactivity.

53. The dialog box control system of claim 52, wherein the plurality of dialog boxes are logically associated in a hierarchical relationship based on the location of the dialog launch display element used to launch each dialog box, said hierarchical relationship defining parent-child relationships between said plurality of dialog boxes, and further wherein said dialog launch modalities comprise:
a modal dialog launch modality wherein only the selected dialog box and its parent dialog boxes are open simultaneously, and wherein the user can only interact with said active dialog box until said active dialog box is closed;
a modeless dialog launch modality wherein any number of dialog boxes may be open simultaneously, and wherein the user can interact with any aspect of the graphical user interface other than the active dialog box while the active dialog box is open; and
a semi-modeless dialog launch modality wherein only the selected dialog box and parent dialog boxes of the selected dialog box are open simultaneously, and wherein a user can interact with selected aspects of the graphical user interface other than the active dialog box while the active dialog box is open.

54. A method for managing a graphical user interface in a computer-based signal measurement system having an operating system, in response to a receipt of an activation request to open a selected dialog box, wherein all dialog boxes are logically related in a hierarchical manner based upon launch dependencies, the method comprising the steps of:
(a) recursively closing all open child dialog boxes not having a predetermined logical relationship with the selected dialog box; and
(b) opening the selected dialog box.

55. The method of claim 54,
wherein said predetermined logical relationship with said selected dialog box include all open child dialog boxes of said selected dialog box's parent dialog box, and
wherein said activation request identifies the selected dialog box and a parent dialog box through which said selected dialog box was launched.

56. The method of claim 55, wherein the system includes a dialog map data structure identifying the hierarchical relationship between said dialog boxes, wherein said dialog map includes a record associated with each dialog box, each such record having a dialog pointer to a dialog that controls the display and interactivity with the dialog box
wherein said step (a) comprises the steps of:
(1) locating first and second records in said data map associated with the selected dialog box and said parent dialog box, respectively;
(2) closing each child dialog box of the selected dialog box's parent dialog box; and (3) cross-linking said first and second records, identifying the parent-child relationship established between said selected dialog box and said parent dialog box.

57. The method of claim 56, wherein said step (2) comprises the steps of:
   a) accessing said dialog map data structure to locate a record associated with the selected dialog box using the dialog ID provided in the activation request; and
   b) accessing said dialog map data structure to locate a record associated with the parent dialog box of the selected dialog box using a parent dialog ID provided in the activation request.

58. The method of claim 56, wherein said data map includes, for an associated dialog box, a list of pointers to each said dialog associated with dialog boxes which are child dialog boxes of said associated dialog box, and a parent ID field for storing an identifier for said parent dialog box, and wherein said step (3) comprises the steps of:
   a) inserting a pointer to the dialog associated with the selected dialog box on the child list of the data map record associated with the parent dialog box; and
   b) setting the parent ID of the data map record associated with the selected dialog box to the identifier for the parent dialog box.

59. The method of claim 58, further comprising the step of:
   (4) setting the displayed flag in the record for the selected dialog box.

60. The method of claim 59, further comprising the step of:
   (5) setting the permanent flag in the record for the activated dialog box when said selected dialog box is a permanent dialog box, wherein permanent dialog boxes are dialog boxes which are continually displayed on the graphical user interface and immediately apply received control inputs to the implementing computer based system.

61. The method of claim 60, wherein a Z-order list is created to maintain a relative ordering of displayed dialog boxes on the graphical user interface, said ordering indicating which dialog box overlays which other dialog boxes; and wherein the method further comprises the step of:

(6) updating said Z-order list to identify said selected dialog box as the active dialog box completely visible on the graphical user interface.

62. A method for managing dialog boxes on a computer user interface in a signal measurement system comprising the steps of:
   (a) receiving a user selection of a first dialog launch display element representing a first dialog box;
   (b) opening the first dialog box on the computer user interface;
   (c) receiving a user selection of a second dialog launch display element representing a second dialog box, said second dialog launch display element is located on the opened first dialog box
   (d) opening the second dialog box on the computer user interface, wherein a parent-child relationship between said first and second dialog boxes with said first dialog box being the parent dialog box and said second dialog box being the child dialog box;
   (e) receiving a user selection of a third dialog launch display element representing a third dialog box, said third dialog launch display element not being located on either the opened first or second dialog boxes;
   (f) closing said second dialog box;
   (g) closing said first dialog box; and
   (h) opening said third dialog box.

63. A method for managing dialog boxes on a computer user interface comprising the steps of:
   (a) receiving a user selection of a plurality of dialog launch display elements each representing a dialog box;
   (b) opening said plurality of represented dialog boxes;
   (c) receiving a user selection of a dialog launch display element representing an associated desired dialog box having a logical relationship with one or more of said plurality of opened dialog boxes;
   (d) closing those of said plurality of open dialog boxes not having said predetermined relationship with said desired dialog box; and
   (e) opening said desired dialog box.

* * * * *